(12) United States Patent
Ishiguro et al.

(10) Patent No.: US 7,730,345 B2
(45) Date of Patent: *Jun. 1, 2010

(54) CONTENTS FURNISHING SYSTEM

(75) Inventors: Ryuji Ishiguro, Tokyo (JP); Itaru Kawakami, Kanagawa (JP); Mitsuru Tanabe, Kanagawa (JP); Yuichi Ezura, Kanagawa (JP); Ichiro Sato, Chiba (JP); Munetake Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 11/688,569

(22) Filed: Mar. 20, 2007

(65) Prior Publication Data
US 2007/0174302 A1    Jul. 26, 2007

Related U.S. Application Data

(63) Continuation of application No. 10/887,102, filed on Jul. 9, 2004, now Pat. No. 7,213,164, which is a continuation of application No. 09/869,124, filed as application No. PCT/JP00/07475 on Oct. 25, 2000, now Pat. No. 6,807,641.

(30) Foreign Application Priority Data
Oct. 25, 1999    (JP)    ................................ 11-303138

(51) Int. Cl.
*G06F 11/00* (2006.01)
(52) U.S. Cl. ............................................................ 714/6
(58) Field of Classification Search ........................ None
See application file for complete search history.

(56) References Cited
U.S. PATENT DOCUMENTS
5,109,413 A    4/1992    Comerford et al.
5,822,771 A    10/1998    Akiyama et al.
5,917,912 A    6/1999    Ginter et al.
5,987,607 A    11/1999    Tsumura
6,023,766 A    2/2000    Yamamura (Continued)

FOREIGN PATENT DOCUMENTS
EP    0 895 148    2/1999

(Continued)

OTHER PUBLICATIONS

F. Takahashi, et al., Nikkei Electronics, No. 738, pp. 87-111, "Tokushu: Contents Haishin; Ongaku Haishin Mattanashi; Seibi Isogu Chosakuken Hogo Gijutsu", Mar. 8, 1999.

(Continued)

*Primary Examiner*—Michael C Maskulinski
(74) *Attorney, Agent, or Firm*—Oblon, Spivak, McClelland, Maier & Neustadt, L.L.P.

(57) ABSTRACT

Even if contents data distributed over a network are once destroyed, the contents data are restored, as the copyright protection is maintained. A PC memorizes backup of distributed music contents on a hard disc, at the same time as it transmits the using log information of the music contents stored in the hard disc to an EMD server. If the music contents in the hard disc are destroyed, the PC acquires the using log information from the EMD server to reproduce the backup data memorized in the hard disc depending on the using log information.

16 Claims, 26 Drawing Sheets

U.S. PATENT DOCUMENTS

| | | | |
|---|---|---|---|
| 6,075,862 | A | 6/2000 | Yoshida et al. |
| 6,577,735 | B1 | 6/2003 | Bharat |
| 6,587,842 | B1 | 7/2003 | Watts |
| 6,601,046 | B1 | 7/2003 | Epstein |
| 7,058,604 | B2 | 6/2006 | Kurumida |
| 2001/0008016 | A1 | 7/2001 | Kotani et al. |
| 2006/0149680 | A1 | 7/2006 | Stefik et al. |
| 2006/0190409 | A1 | 8/2006 | Hillegass et al. |

FOREIGN PATENT DOCUMENTS

| | | |
|---|---|---|
| JP | 7-131452 | 5/1995 |
| JP | 8-307558 | 11/1996 |
| JP | 9-55731 | 2/1997 |
| JP | 10-222063 | 8/1998 |
| JP | 11-85504 | 3/1999 |

OTHER PUBLICATIONS

T. Yoshio, Nikkei Electronics, No. 739, pp. 49-53, "Kaisetsu Digital Chosakuken; Kogata A Memory Card De Onganu Chosakuken Wo Mamoru", Mar. 22, 1999.

FIG. 9A

| POLICY | VALUE |
|---|---|
| from | 99/10/25 |
| to | 99/11/24 |
| pay/play | yes/10yen |

FIG. 9B

| CONTENTS |
|---|
| USING CONDITION INFORMATION |

| | |
|---|---|
| INDEX FILE | 331 |
| AUTOMATON FILE | 332 |
| PARAMETER FILE | 333 |
| HYSTERESIS FILE | 334 |

FIG. 10

| | |
|---|---|
| Automaton | 341 |
| $MAC_{K_C}$ (Automaton) | 342 |
| $Sig_{K_E^{-1}}$ (Automaton) | 343 |
| Cert ($K_E^1$) | 344 |

FIG. 11

⟨$q_1$, pay10, $q_2$⟩
⟨$q_1$, a.pay1000, $q_3$⟩
⟨$q_1$, pay(10×n), $q_4$⟩
⟨$q_2$, play, $q_1$⟩
⟨$q_3$, play, $q_3$⟩
⟨$q_4$, play×n, $q_4$⟩
⟨$q_4$, ε, $q_1$⟩
⟨$q_5$, pay100, $q_6$⟩
⟨$q_5$, a.pay2000, $q_7$⟩
⟨$q_6$, copy, $q_5$⟩
⟨$q_7$, copy, $q_7$⟩
⟨$q_8$, play, $q_8$⟩
⟨$q_8$, copy, $q_9$⟩

FIG.13

| Entity ID | ~345 |
| Content ID | ~346 |
| Automaton Version | ~347 |
| Variables | ~348 |
| Tuples | ~349 |
| Automaton Version | ~347 |
| Variables | ~348 |
| Tuples | ~349 |
| ⋮ | |

FIG.14

```
<!ENTITY% event" (
        play                    1
        copy                    1
        pay-for-play            1
        pay-for-copy            1
        pay-for-album-play      1
        pay-for-album-copy      1
        from                    1
        to                      1
        null                    1
)">
<!ENTITY% command" (
        drop                    1
        dup                     1
        swap                    1
        add                     1
        subtract                1
        multiply                1
        divide                  1
        remainder               1
        upper                   1
        lower                   1
        equal                   1
        less                    1
        greater                 1
        less-equal              1
        greater-equal           1
        and                     1
        or                      1
        not                     1
        bit-and                 1
        bit-or                  1
        bit-xor                 1
        bit-not                 1
)">
```

FIG.15

Content playable from 1999/9/1

```
<automaton>

<!--This usage rule system has one Right Unit.
  Initial state is q1-->
    <Initial-right-unit state="q1"/>

<node state = "q1">
        <!--If after 1999/9/1, transfer to q2-->
        <rule event="from" next-state="q2">
            <arguments>
                <integer value="time:19990901"/>
            </arguments>
        </rule>
    </node>

<node state = "q2">
        <!-- playable -->
        <rule event="play" next-state="q2"/>
    </node>

</automaton>
```

FIG.16

Content playable until 1999/10/31

```
<automaton>

<!-- This Usage Rule System has one Right Unit.
Initial state is q2 -->
     <Initial-right-unit state="q2"/>

<node state = "q2">
       <!--If after 1999/10/31, transfer to end -->
       <rule event="to" next-state="end">
         <arguments>
            <integer value="time:19991031"/>
         </arguments>
       </rule>

<!-- playable -->
       <rule event="play" next-state="q2">
       </rule>
    </node>

<!--Unusable state -->
    <node state = "end"/>

</automaton>
```

FIG.18

Content playable 16 times from 1999/9/1 to 1999/10/31

```
<automaton>

<!--Define counter variables for playable numbers. Initial value is 16 -->
    <define-variable name="count" initial-value="16" />

<!-- This Usage Rule System has one Right Unit. Initial state is q1 -->
    <initial-right-unit state="q1" />

<node state="q1">
        <!--From 1999/9/1 transfer to q2 -->
        <rule event="from" next-state="q2">
            <arguments>
                <integer value="time:19990901" />
            </arguments>
        </rule>
    </node>

<node state="q2">
        <!--From 1999/10/31, transfer to end -->
        <rule event="to" next-state="end">
            <arguments>
                <integer value="time:19991031" />
            </arguments>
        </rule>

<rule event="play" next-state="q2">
            <!--Playable only for "count" numbers -->
            <arguments>
                <variable name="count" />
                <command name="load" />
            </arguments>
            <!--If this rule is selected, the "count" number decrements by one-->
            <action>
                <variable name="count" />
                <command name="load" />
                <integer value="1" />
                <command name="subtract" />
                <variable name="count" />
                <command name="store" />
            </action>
        </rule>
    </node>

<!--Unusable state-->
    <node state="end" />

</automaton>
```

FIG.20

Content playable less than and/or equal to 16 times

```
〈automaton〉

〈!--Define valuable counter for playable numbers. Initial value is 16 --〉
    〈define-variable name="count" initial-value="16" /〉

〈!-- Usage Rule System has one Right Unit. Initial state is q2 --〉
    〈initial-right-unit state="q1" /〉

〈node state="q2"〉
        〈rule event="play" next-state="q2"〉
            〈!--"Count" number of times playable --〉
            〈arguments〉
                〈variable name="count" /〉
                〈command name="load" /〉
            〈/arguments〉
            〈!--If this rule is selected. "count" number decrements by one--〉
            〈action〉
                〈variable name="count" /〉
                〈command name="load" /〉
                〈integer value="1" /〉
                〈command name="subtract" /〉
                〈variable name="count" /〉
                〈command name="store" /〉
            〈/action〉
        〈/rule〉
    〈/node〉

〈/automaton〉
```

FIG.22

CONTENTS FURNISHING SYSTEM

CROSS REFERENCE TO RELATED APPLICATIONS

This application is a continuation of U.S. patent application Ser. No. 10/887,102, filed Jul. 9, 2004, which is a continuation of U.S. application Ser. No. 09/869,124, filed Jun. 25, 2001, now U.S. Pat. No. 6,807,641, issued Oct. 19, 2004, which claims priority to International Patent Application No. PCT/JP00/07475, filed Oct. 25, 2000, and Japanese Patent Application No. 11-303138, filed Oct. 25, 1999, the entire contents of each of which are incorporated herein by reference in their entirety.

TECHNICAL FIELD

This invention relates to a contents furnishing system for furnishing contents data, such as music data, over a network, a contents distribution system and to a recording medium.

BACKGROUND ART

Recently, on-line distribution of music contents employing a network, such as Internet or cable television, has come to be put to practical application.

If, in this distribution system for music contents, the contents distributors distribute the musical contents over the network, on e.g., the Web. The user exploiting this music distribution system uses his or her own personal computer to access the Web furnished by the contents distributor to download the desired music contents.

Meanwhile, in this music distribution system, the downloaded music contents are made payable over e.g., a network.

However, if once the data in a personal computer owned by a user is destroyed, the music contents, once purchased, are lost. So, for restoring the music contents, the contents need to be purchased again.

DISCLOSURE OF THE INVENTION

It is therefore an object of the present invention to provide a contents furnishing system in which, even if the contents, distributed over a network, are destroyed, the contents data can be restored as the copyright protection is assured.

It is another object of the present invention to provide a contents distribution system in which, even if the contents, distributed over a network, are destroyed, the contents data can be restored as the copyright protection is assured.

It is a further object of the present invention to provide a recording medium having stored therein a playback control program, which is capable of restoring contents data even if the contents data, distributed over a network, are destroyed, as the copyright protection is assured.

In one aspect, the present invention provides a contents furnishing system including a contents server for distributing contents data over a network, and a data processor having a reproduction control program for reproducing and/or controlling contents data, in which the data processor stores the contents data distributed from the contents server on a recording medium for reproduction and/or control, and stores backup data of the distributed contents data on a recording medium, the data processor also transmitting the using log information of the contents data to the contents server. The data processor acquires the using log information from the contents server if the contents data cease to be available from the recording medium, while performing reproduction and/or control of the backup data of the contents data stored in the recording medium depending on the using log information.

In this contents furnishing system, the data processor reproduces and/or controls backup restoration data based on the using log information re-acquired from the contents server.

In another aspect, the present invention provides a contents furnishing system including a contents server for distributing contents data over a network, and a data processor having a reproduction control program for reproducing and/or controlling contents data, in which the data processor stores the contents data distributed from the contents server on a recording medium for reproduction and/or control, and transmits the using log information of the contents data to the contents server. The data processor has contents data re-distributed from the contents server, if the contents data cease to be available from the recording medium. The data processor also acquires the using log information from the contents server while performing reproduction and/or control of the re-distributed contents data depending on the using log information.

In this contents furnishing system, the data processor reproduces and/or controls re-distributed contents data based on the using log information re-acquired from the contents server.

In still another aspect, the present invention provides a method for distributing contents between a data processor having a reproduction control program for reproducing and/or controlling contents data and a contents server for distributing the contents data through a network to the data processor, in which the method includes the steps of the contents server distributing contents data to the data processor, the data processor memorizing the contents data distributed from the contents server in a recording medium for reproduction and/or control and also memorizing backup data of the distributed contents data in a recording medium, the data processor transmitting the using log information of the contents data to the contents server, the contents server transmitting the using log information to the data processor if the data processor is unable to acquire the contents data from the recording medium, and the data processor reproducing and/or controlling the backup data of the contents data stored in the recording medium responsive to the using log information.

In this contents distributing method, the data processor reproduces and/or controls backup restoration data based on the using log information re-acquired from the contents server.

In still another aspect, the present invention provides a method for distributing contents between a data processor having a reproduction control program for reproducing and/or controlling contents data and a contents server for distributing the contents data through a network to the data processor, in which the method includes the steps of the contents server distributing contents data to the data processor, the data processor memorizing the contents data distributed from the contents server in a recording medium for reproduction and/or control, the data processor transmitting the using log information of the contents data to the contents server, the contents server re-distributing, if the data processor is unable to acquire the contents data from the recording medium, the contents data that has become unavailable to the data processor and transmitting the using log information to the data processor, and the data processor reproducing and/or controlling the re-distributed contents data in accordance with the using log information.

In this contents distributing method, the data processor reproduces and/or controls re-distributed contents data based on the using log information re-acquired from the contents server.

In still another aspect, the present invention provides a recording medium adapted for being installed in a data processor and having stored therein a reproduction control program for acquiring contents data distributed over a network from a contents server for reproducing and/or controlling the contents data, in which the reproduction control program includes memorizing the contents data distributed from the contents server in a recording medium for reproduction and/or control and memorizing backup data of the distributed contents data, and transmitting the using log information of the contents data to the contents server and acquiring the using log information from the contents server if the contents data cease to be available from the recording medium and reproducing and/or controlling backup data of contents data stored in the recording medium in keeping with the using log information.

In this recording medium, the reproduction control program reproduces and/or controls the restoration backup data for the data processor, having the reproduction control program installed thereon, based on the using log information re-acquired from the contents server.

In yet another aspect, the present invention provides a recording medium adapted for being installed in a data processor and having stored therein a reproduction control program for acquiring contents data distributed over a network from a contents server for reproducing and/or controlling the contents data, in which the reproduction control program includes memorizing the contents data distributed from the contents server in a recording medium for reproduction and/or control, transmitting the using log information of the contents data to the contents server, having contents data re-distributed from the contents server, if the contents data cease to be available from the recording medium, and acquiring the using log information from the contents server and reproducing and/or controlling the re-distributed contents data in keeping with the using log information.

In this recording medium, the reproduction control program reproduces and/or controls there-distributed contents data for the data processor, having the reproduction control program installed thereon, based on the using log information re-acquired from the contents server.

BRIEF DESCRIPTION OF THE DRAWINGS

FIG. 9 illustrates the format of the routinely used using condition information.

FIG. 10 illustrates a file constituting the unified using condition information employed in a comprehensive management unit.

FIG. 11 illustrates the structure of an automaton file of the unified using condition information.

FIG. 13 represents the automaton in a tuple string.

FIG. 14 illustrates the structure of the automaton stating portion.

FIG. 15 shows an event and a command defined in a DTD determined based on the specification of an XML.

FIG. 16 shows a first statement example of the automaton stating portion.

FIG. 18 shows a second statement example of the automaton stating portion.

FIG. 20 shows a third statement example of the automaton stating portion.

FIG. 22 shows a fourth statement example of the automaton stating portion.

BEST MODE FOR CARRYING OUT THE INVENTION

Figure 1:
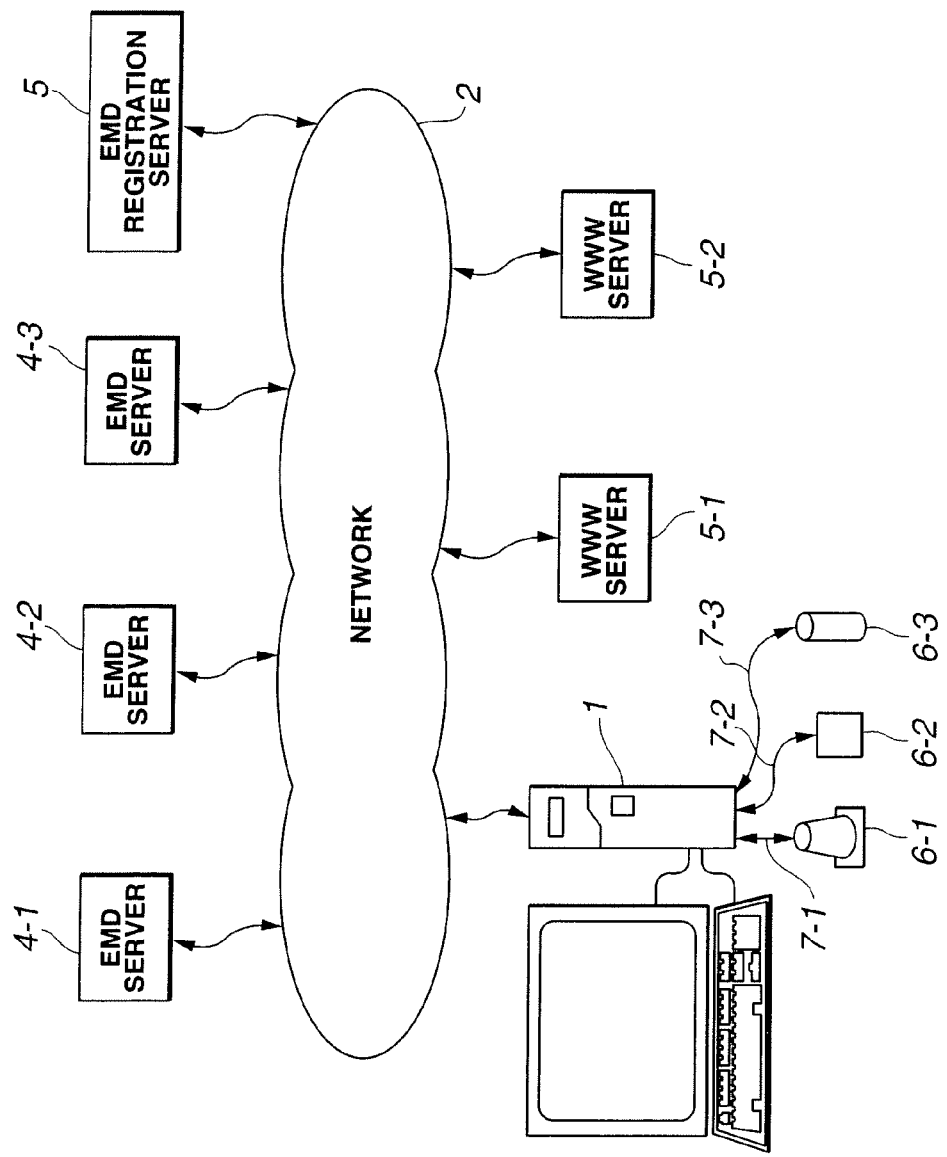
FIG. 1 shows a system structure of a music contents distributing system embodying the present invention.

Referring to the drawings, a music contents distributing system, embodying the present invention, representing the best mode of execution of the present invention, is explained in detail. This music contents distribution system is such a system which downloads the music contents from a server to a personal computer or to a portable device over a network and which supervises the so-downloaded music contents and music contents read out from a CD.

(1) Overall Structure of Music Contents Distributing System

FIG. 1 shows a system configuration of a music contents distributing system 1 embodying the present invention.

The music contents distributing system 1, embodying the present invention, includes a personal computer 1, a network 2, such as local area network, a registration server 3, a plurality of EMD (electrical music distribution) servers 4 (4-1, 4-2 and 4-3) distributing music contents, referred to below as contents, and WWW servers 5 (5-1 and 5-2). The personal computer 1 has stored therein a storage medium, such as a memory card, over USB cables 7 (7-1, 7-2 and 7-3), and is connected to portable devices 6 (6-1, 6-2, 6-3) as a portable music reproducing equipment for reproducing the contents.

The personal computer 1 is connected over a network 2 to the EMD registration server 3, EMD servers 4 (4-1, 4-2 and 4-3) and to the WWW (World Wide Web) servers 5 (5-1 and 5-2).

The personal computer 1 receives contents compressed in accordance with a pre-set compression system, and encrypts the compressed contents in accordance with a pre-set encryption system for storage. As the compression system, ATRAC (adaptive transform acoustic coding) 3™ or MP3 (MPEG audio layer-3) may be used. As the encryption system, description (data encryption standard), for example, is used.

In receiving the distributed contents, the personal computer 1 also receives distributed using condition information, indicating the using conditions for the contents, to record the distributed data. When recording the contents read out from e.g., a CD, the personal computer 1 generates the using condition information depending on the contents reproducing conditions to record the generated using condition information.

Also, the personal computer 1 records and stores the contents, recorded encrypted, in the portable devices 6 (6-1, 6-2 and 6-3), over th USB cables 7 (7-1, 7-2 and 7-3), along with the relevant information, such as the using condition information, titles of musical numbers or the names of the performers, while updating the using condition information responsive to the recording and storage. This processing is called checkout. In this checking-out operation, the number of times of possible checking-out operations for the contents, recorded by the personal computer 1, is decremented by 1 in the using condition information. If the number of times of possible checking-out operations is 0, the corresponding contents cannot be checked out.

Moreover, the personal computer 1 erases the contents stored in the portable devices 6 (6-1, 6-2 and 6-3), through the USB cables 7 (7-1, 7-2 and 7-3), and updates the using condition information in association with the erasure. This erasure operation is called check-in. In this check-in operation, the number of times of the possible checking-out operations, recorded by the personal computer 1, is incremented by 1. It is noted that the contents may also be made unusable instead of being erased.

It is noted that the personal computer 1 is unable to check-in the contents some other personal computer has checked out to the portable device 6. That is, the personal computer 1 is only able to check-in the contents checked out by no other than the personal computer 1.

When the personal computer 1 has started acquiring the contents from the EMD servers 4 (4-1, 4-2 and 4-3), the EMD server 3 is responsive to a request from the personal computer 1 to transmit an authentication key necessary for reciprocal authentication between the personal computer 1 and the EMD servers 4 (4-1, 4-2 and 4-3) to the personal computer 1, over the network 2, while transmitting the program for connection to the EMD servers 4 (4-1, 4-2 and 4-3) to the personal computer 1.

The EMD servers 4 (4-1, 4-2 and 4-3) are each responsive to a request of the personal computer 1 to furnish contents to the personal computer 1, over the network 2, along with the using condition information and data relevant to the contents, such as the titles of the music numbers or the performers.

The contents distributed by the respective EMD servers 4 (4-1, 4-2 and 4-3) have been compressed in accordance with a pre-set encryption system which may differ from one server to another. On the other hand, the contents furnished by the EMD servers 4 (4-1, 4-2 and 4-3) are distributed encrypted in accordance with a pre-set encryption system which may also differ from one server to another.

The WWW servers 5 (5-1, 5-2) are each responsive to the request from the personal computer 1 to furnish to the personal computer 1 data corresponding to a CD which has read the contents, such as album name of the CD or the CD selling company) and data corresponding to the contents read out from the CD, such as the name of the musical number or the composer's name, to the personal computer 1.

The portable devices 6 (6-1, 6-2 and 6-3) reproduce the contents furnished from the personal computer 1, that is the content as checked out, to output the reproduced contents to e.g., a headphone, not shown.

Each of the portable devices 6 (6-1, 6-2 and 6-3) has a recording medium for storage of the contents. As the recording medium, an unremovable IC memory, loaded on an internal substrate of an apparatus, or a removable memory card, is used. The portable devices 6 (6-1, 6-2 and 6-3) are connected to the personal computer 1 over physical interfaces 7 (7-1, 7-2 and 7-3), such as USB, for transferring the contents. The contents, to which is also appended the using condition information, are transferred in the encrypted and compressed form.

The portable devices 6 (6-1, 6-2 and 6-3) are usually employed in such a state that the respective devices 6 are disconnected from the personal computer 1. If a replay command is issued from the user in this state, the encrypted contents are read out from the recording medium and reproduced. Moreover, the portable devices 6 (6-1, 6-2 and 6-3) manage control for limiting the reproduction, based on the using condition information appended to the respective contents, or as necessary, deleting the contents, or updating the using condition information.

In the following, if it is unnecessary to distinguish the portable devices 6 (6-1, 6-2 and 6-3) from one another, they are simply referred to as portable devices 6.

Figure 2:
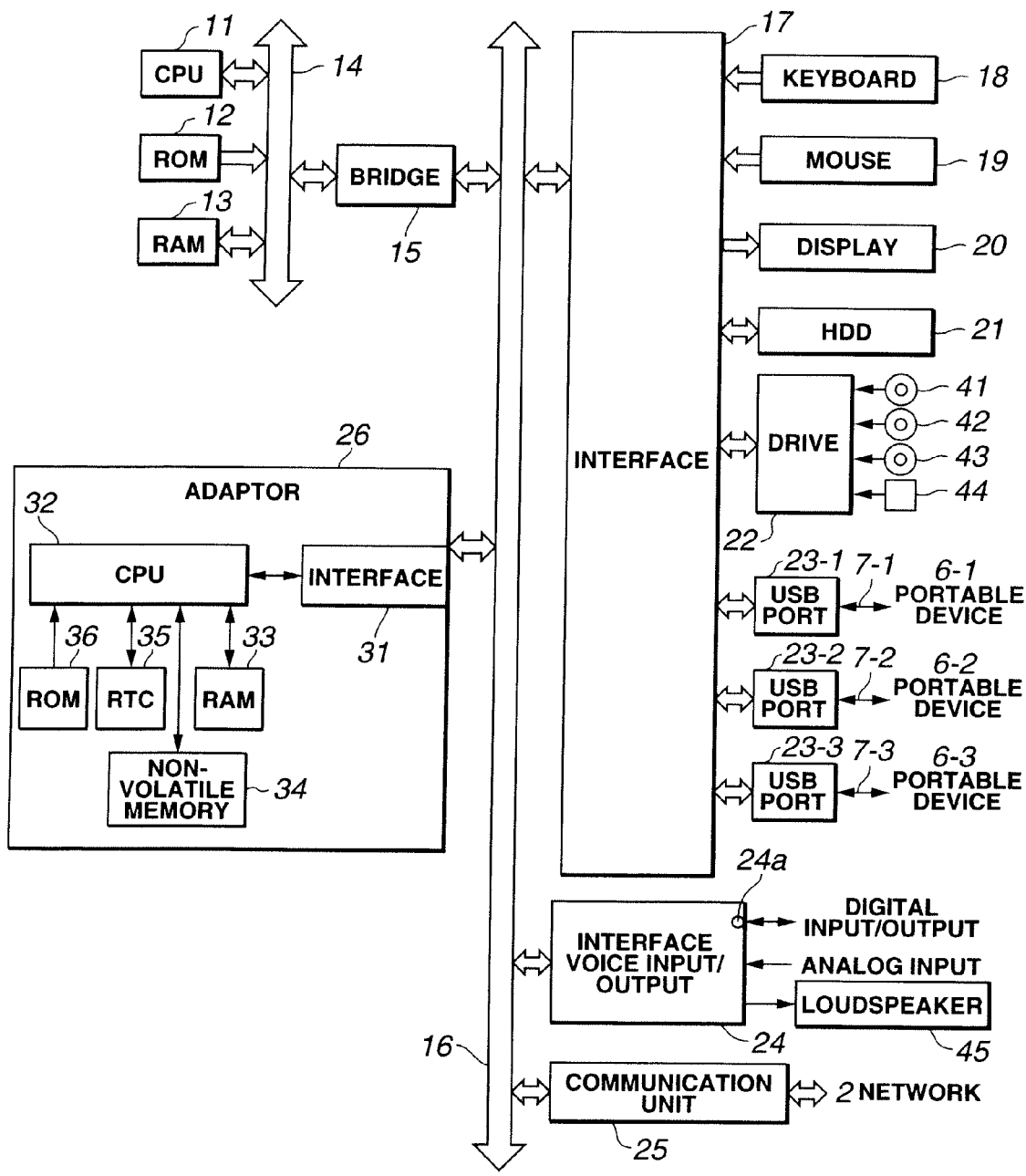
FIG. 2 explains the configuration of a personal computer used in the content data management system.

FIG. 2 is an explanatory illustration of the configuration of the personal computer 1.

As shown, the personal computer 1 comprises a CPU (central processing unit) 11. The CPU 11 actually executes a variety of applications (will further be described later) and OS (operating system). A ROM (read-only memory) 12 is also provided in the personal computer 1, and generally stores basically fixed data of programs and computational parameters used in the CPU 11. Also, a RAM (random-access memory) 13 is included in the personal computer 1 to store programs used for execution of the applications and OS by the CPU 11 and parameters which are appropriately variable in the execution of the applications and OS. The CPU 11, ROM 12 and RAM 13 are mutually connected to each other by a host bus 14 composed of a CPU bus, etc.

The host bus 14 is connected to an external bus 16 such as PCI (peripheral component interconnect/interface) by a bridge 15.

A keyboard 18 is operated by the user to input various commands to the CPU 11. A mouse 19 which is used by the user to point and select a point on the screen of a display unit 20. The display unit 20 is a liquid crystal display or CRT (cathode-ray tube) to display a variety of information in the form of a text and/or image. Further, an HDD (hard disc drive) 21 drives a hard disc to write or read a program to be executed by the CPU 11 and information to or from the hard disc.

The drive 22 reads data or program recorded in any of a magnetic disc 41, optical disc 42 (including CD), magneto-optical disc 43 and semiconductor memory 44, whichever is connected to the drive 22, and supplies the read data or program to the RAM 13 connected thereto by an interface 17, external bus 16, bridge 15 and host bus 14.

The USB port 23 (23-1, 23-2, 23-3) has the portable device 6 (6-1, 6-2, 6-3) connected thereto by the USB cable 7 (7-1, 7-2, 7-3), and outputs data (including a content or a command to the portable device 6, for example) supplied from the HDD 21, CPU 11 or RAM 13 to the portable device 6 (6-1, 6-2, 6-3) via the interface 17, external bus 16, bridge 15 or host bus 14.

An audio input/output interface 24 having an IEC (International Electrotechnical Commission) 60958 terminal 24 interfaces a digital audio input/output or an analog audio input/output. A speaker 45 provides a predetermined sound corresponding to each content based on an audio signal supplied from the audio input/output interface 24.

The accessories including the keyboard 18, the mouse 19, the display 20, the HDD 21, drive 22, the USB port 23 and the audio input/output interface 24 are connected to the interface 17 which in turn is connected to th CPU 11 by the external bus 16, bridge 15 and host bus 14.

A communications block 25 connected to the network 2, and transmit, as stored in packets in a predetermined manner, data (e.g., request for registration or request for sending a content) supplied from the CPU 11 or HDD 21 via the network 2 while outputting data (e.g., authenticate key or content) stored in received packets to the CPU 11, RAM 13 or HDD 21 via the network 2.

The CPU 32 of an adaptor 26 formed integrally as a semiconductor IC, and connected to the personal computer 1 is connected to the CPU 11 by the external bus 16, bridge 15 and host bus 14 and thus cooperates with the CPU 11 to effect various processes. The RAM 33 stores data and programs necessary for execution of the various processes by the CPU 32. The nonvolatile memory 34 stores data which have to be held still after the personal computer 1 is turned off. The ROM 36 stores a program for decryption of an encrypted program transferred from the personal computer 1. The RTC (Real Time Clock) 35 keeps time to provide time information. The semiconductor IC is designed to have a secured environment and has tolerance toward fraudulent accesses from outside. This function may be structured in a software program.

The communications block 25 and adaptor 26 are connected to the CPU 11 by the external bus 16, bridge 15 and host bus 14.

Figure 3:
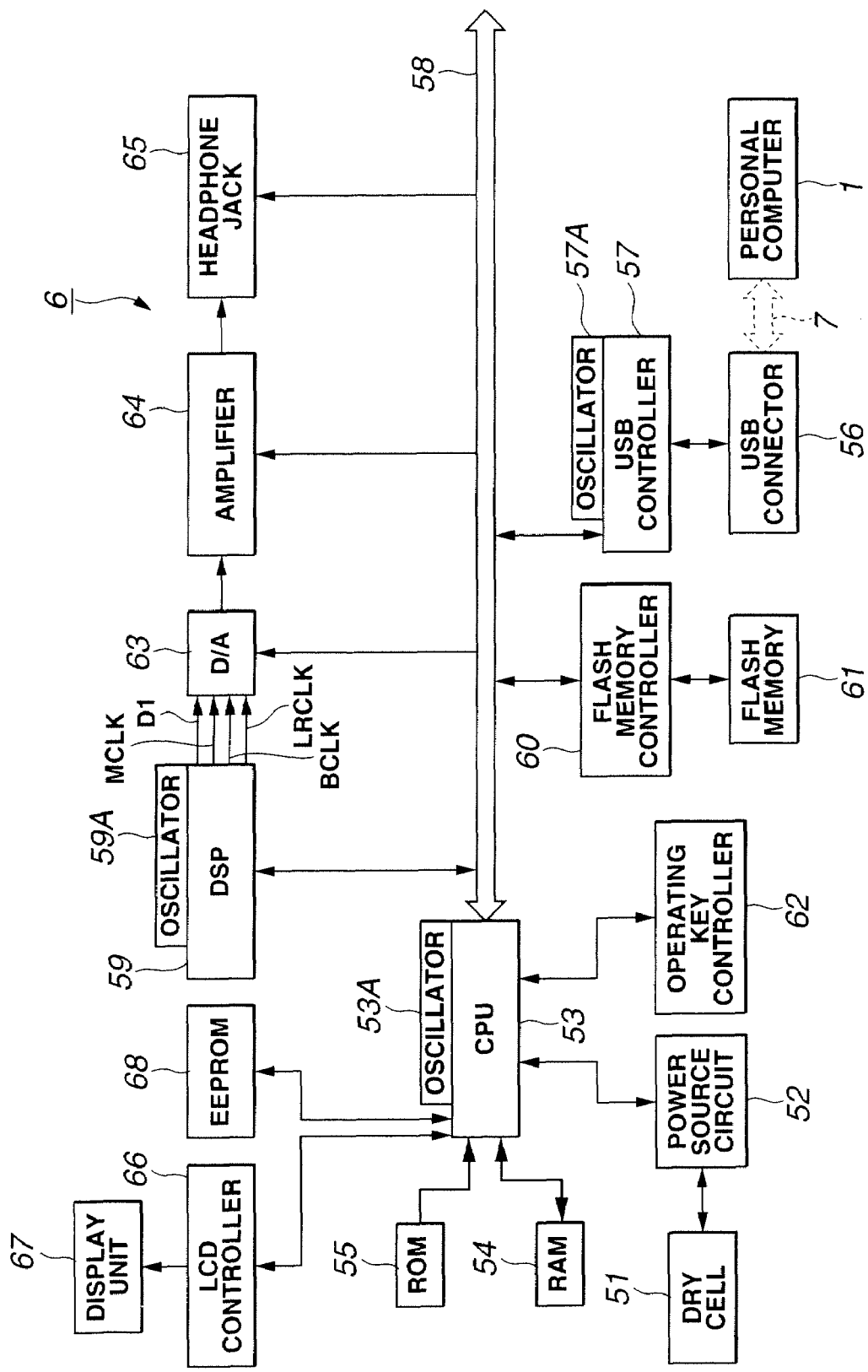
FIG. 3 explains the configuration of a portable device included in the content data management system.

Referring now to FIG. 3, the portable device 6 is schematically illustrated in the form of a block diagram.

A power circuit 52 converts a voltage supplied from a dry cell 51 to an internal power of a predetermined voltage. Supplying the power to components from a CPU 53 to display unit 67, the power circuit 52 will thus drive the entire portable device 6.

When connected to the personal computer 1 by a USB connector 56 and USB cable 7, the USB controller 57 will supply data including a content transferred from the personal computer 1 to the CPU 53 via an internal bus 58.

A data to be transferred from the personal computer 1 is composed of data of 64 bytes per packet, and transferred from the personal computer 1 at a transfer rate of 12 Mbits/sec.

A data to be transferred to the portable device 6 is composed of a header and content. The header stores a content ID, file name, header size, content key, file size, codec ID, file information, etc. and also using condition information, etc., necessary for the playback limitation. The content is coded by the encoding method such as ATRAC3 and encrypted.

The header size indicates a data length of a header (e.g., 33 bytes), and the file size indicates a data length of the content (e.g., 33,636,138 bytes).

The content key is a key for decryption of an encrypted content, and transmitted from the personal computer 1 to the portable device 6 in a format encrypted based on a session key (provisional) generated via a mutual authentication between the personal computer 1 and portable device 6.

When the portable device 6 is connected to the USB port 23 of the personal computer 1 by the USB cable 7, there will be made a mutual authentication between the portable device 6 and personal computer 1. This mutual authentication is of a challenge-response type for example. Note that a DSP (digital signal processor) 59 is also provided in the portable device 6 to decrypt an encrypted content when the challenge-response type authentication is done.

The above-mentioned challenge-response type mutual authentication is such that in response to a certain value (challenge) generated by the personal computer, for example, there is generated a value (response) by the portable device 6 by using a private key common to both the portable device 6 and personal computer 1. In the challenge-response type mutual authentication, the value generated by the personal computer 1 varies at every authentication. So, even when for example a value generated using the private key and outputted from the portable device 6 is read, that is, a so-called disguised attack takes place, the personal computer 1 can detect a fraudulence since a next mutual authentication is done using a different value.

The content ID is an ID for a content to identify the content.

The codec ID is an ID corresponding to an encoding method for a content. For example, a codec ID of "1" corresponds to ATRAC3 while a codec ID of "0" corresponds to MP3 (MPEG (Moving Picture Experts Group) Audio Layer-3).

The file name is a data resulted from conversion of a content file (will further be described later) corresponding to a content and recorded in the personal computer 1 to an ASCII (American National Standard Code for Information Interchange) code. The file information is a data resulted from conversion of a music piece title (content name), name of the artist playing the music piece, name of the songwriter of the music piece or name of the composer of the music piece to an ASCII code.

When the portable device 6 receives a content and a content write command from the personal computer 1, the CPU 53 which executes a main program read from a RAM 54 or ROM 55, will receive the write command, control a flash memory controller 60 and write to a flash memory 61 the content received from the personal computer 1.

The flash memory 61 has a storage capacity of about 64 Mbytes to store the content. Also, the flash memory has stored therein in advance a playback code for expansion of a content having been compressed in a predetermined manner.

Note that the flash memory 61 may be formed as a memory card which is connectable to, and removable from, the portable device 6.

When the CPU 53 is supplied with a playback command corresponding to a push-down operation of a play/stop button (not shown) via an operation key controller 62, it will make the flash memory controller 60 read the playback code and content from the flash memory 61 and transfer them to the DSP 59 of the portable device 6.

After detecting error in the content in the CRC (cyclic redundancy check) method according to the playback code transferred from the flash memory 61, the DSP 59 will play back the content and the played-back data (indicated with a reference D1 in FIG. 3) to a digital/analog conversion circuit 63.

The DSP 59 is formed integrally with a transmission circuit (not shown) provided inside the portable device 6 to play back a content based on a master clock MCLK from an external crystal oscillator 59A, and supplies the digital/analog conversion circuit 63 with the master clock MCLK, a bit clock BCLK generated by an internal oscillation circuit based on the master clock MCLK and having a predetermined frequency, and an operating clock LRCLK composed of an L-channel clock LCLK and R-channel clock RCLK in the units of frames.

For playing back a content, the DSP 59 will supply the above-mentioned operating clock to the digital/analog conversion circuit 63 according to the playback code. When playing back no content, the DSP 59 will stop supplying the operating clock according to the playback code to turn off the digital/analog conversion circuit 63, thereby reducing the power consumption of the entire portable device 6.

Similarly, the CPU 53 and USB controller 57 have external crystal oscillators 53A and 57A connected thereto, respectively, and effect predetermined operations on the basis of master clocks MCLK supplied from the oscillators 53A and 57A, respectively.

Because of the above-mentioned construction, the portable device 6 needs no clock generation module to supply a clock to each of the CPU 53, DSP 59 and USB controller 57 and thus can be designed to have a simpler and more compact circuit construction.

The digital/analog conversion circuit 63 converts a played-back content to an analog audio signal and supplies it to an amplification circuit 64. The amplification circuit 64 amplifies the audio signal and supplies it to headphone via a headphone jack 65.

Thus, when the play/stop button is pressed, the portable device 6 plays back a content stored in the flash memory 61 under the control of the CPU 53. When the play/stop button is pressed in the course of playing back a content, the portable device 6 will stop playing back the content.

When the play/stop button is pressed after stopping the content playback operation, the portable device 6 will resume the content playback at the position where the playback operation has been stopped under the control of the CPU 53. When a time of a few seconds has passed with no additional operation effected after the playback operation is stopped by pressing the play/stop button, the portable device 6 will automatically shut off the power supply, thereby reducing the power consumption.

It should be noted here that when the play/stop button is pressed after the power supply is turned off, the portable device 6 will resume the playback at the first music piece or music piece No. 1 without playing back the content at the position where the playback operation has previously been stopped.

Also, the CPU 53 of the portable device 6 makes an LCD controller 68 display on a display unit 67 a playback mode (e.g., repeated play, introducing play, etc), equalization adjustment (i.e., gain adjustment for a frequency band of the audio signal), number for music piece, playing time, operation modes such as play, stop, fast forward and fast rewind, and information such as sound volume and voltage level in the dry cell 51.

Further, the portable device 6 stores into an EEPROM 68 a number of contents written in a flash memory 80, locations of blocks of the flash memory 61 in which contents are written, respectively, and a so-called FAT (file allocation table) for various information stored in the memory.

It should be noted that in this embodiment, a content is taken as one block of 64 kbytes and a location of the block for the content of each music piece is stored in the FAT.

In case a FAT is stored into the flash memory 61, when the content of a first music piece is written into the flash memory 61 under the control of the CPU 53, the location of a block corresponding to the content of the first music piece will be written as FAT into the flash memory, and then when the content of a second music piece is written into the flash memory 61, the location of a block corresponding to the content of the second music piece will be written as FAT into the flash memory 61 (in the same area as that in which the first music piece has already been written).

In this way, a FAT is rewritten each time the content is written into the flash memory 61 and further the same data will be written again for reservation to protect the data.

When FAT is written into the flash memory 61, the same area in the flash memory will be rewritten twice correspondingly to the write of the first content. For this reason, when content write has been made a small number of times, a specified number of times for rewrite of the flash memory 61 will be reached, so that the flash memory 61 will not be rewritable any longer.

To avoid the above, the portable device 6 makes the EEPROM 68 store FAT so that FAT will be rewritten a reduced number of times in the flash memory 61 at write of each content.

By storing into the EEPROM 68 a FAT which is rewritten a large number of times, the portable device 6 can be adapted such that content can be written into the flash memory 61 at a frequency tens times larger than that at which FAT is stored into the flash memory 61. Further, since the CPU 53 makes the EEPROM 68 additionally store FAT, the same area in the EEPROM 68 is rewritten at a reduced frequency to prevent the EEPROM 68 from early becoming not rewritable.

When the portable device 6 is connected to the personal computer 1 by the USB cable 7 (which will be referred to as "USB connection" hereinafter), it is recognized based on an interrupt signal supplied from the USB controller 57 to the CPU 53 that the USB connection has been made.

When the portable device 6 recognizes the USB connection, it is supplied with an external power of a specified current value from the personal computer 1 via the USB cable 7, and makes a power circuit 52 stop the power supply from the dry cell 51.

When the USB connection is established, the CPU 53 will stop the DSP 59 from playing back a content. Thus, the CPU 53 will prevent the external power supplied from the personal computer 1 from exceeding the specified current value so that the external power of the specified current value can always be supplied.

Thus, when the USB connection is established, the CPU 53 makes a selection between the power supplied from the dry cell 51 and the power supplied from the personal computer 1. That is, the inexpensive external power from the personal computer 1 can be used, and so the costly power supplied from the dry cell 51 and which costs high is less consumed. Thus, the dry cell 51 can be used for a longer service life.

Note that when supplied with the external power from the personal computer 1 via the USB cable 7, the CPU 53 stops the DSP 59 from playing back a content to reduce the radiation from the DSP 59, so that the radiation of the entire system including the personal computer 1 can further be reduced.

The functions of the personal computer 1 implemented by execution of programs installed in the personal computer 1 will be explained in the following.

Figure 4:
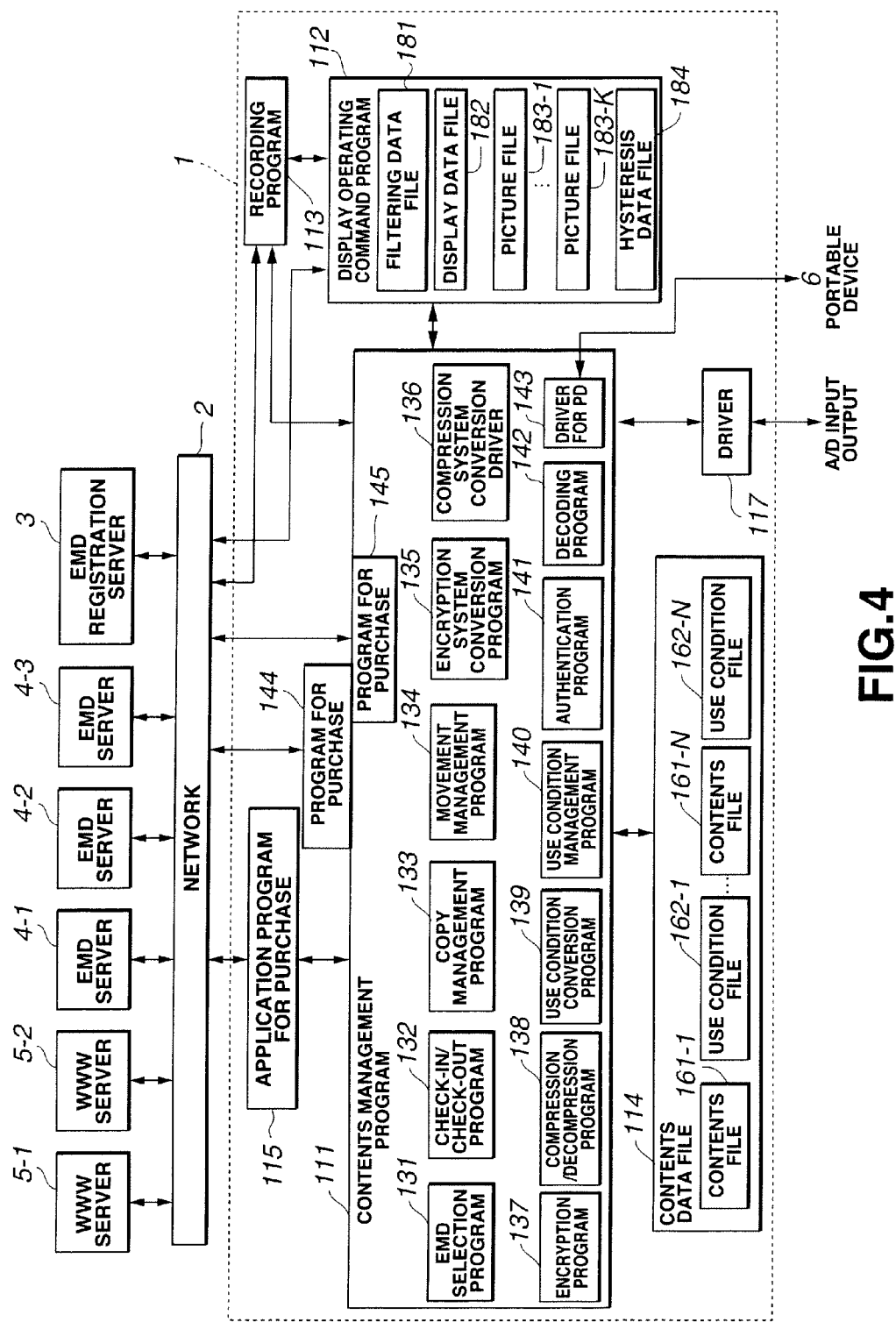
FIG. 4 explains functions of the personal computer.

Referring now to FIG. 4, there is illustrated a diagram of the personal computer 1, explaining the functions of the personal computer 1, implemented by execution of predetermined programs.

As shown, the personal computer 1 uses a content management program 111 which is composed of a plurality of programs including an EMD selection program 131, check-in/check-out management program 132, copy management program 133, move management program 134, encryption method conversion program 135, compression method conversion program 136, encryption program 137, compression/expansion program 138, usage rule conversion program 139, usage rule management program 140, authentication program 141, decryption program 142, PD driver 143, purchase programs 144 and 145.

Of the above programs, the content management program 111 is composed of shuffled or encrypted instructions, for example, to conceal the instructed operations from outside to make it difficult to interpret the instructions (for example, even if the user can read directly the content management program 111, he or she cannot identify the instructions).

The EMD selection program 131 is not included in the content management program 111 when the latter is installed in the personal computer 1 but it is received from the EMD registration server 3 via the network 2 at the time of EMD registration. The EMD selection program 131 selects a connection with the EMD server 4 (4-1 to 4-3) to enable a purchase application program 115, purchase program 144 or 145 to have a communication with the EMD server 4 (4-1 to 4-3) (e.g., download of a content for purchase).

Based on a setting of either check-in or check-out and usage rule files 162-1 to 162-N recorded in a content data base 114, the check-in/check-out management program 132 checks out contents stored in content files 161-1 to 161-N to any of the portable device 6, or checks in contents stored in the portable device 6.

In response to the check-in or check-out having been done, the check-in/check-out management program 132 updates the usage rule stored in the usage rule files 162-1 to 162-N recorded in the content data base 114.

Based on the usage rule files 162-1 to 162-N recorded in the content data base 114, the copy management program 133 copies contents stored in the content files 161-1 to 161-N to any of the portable device 6, or copies contents from the portable device 6 to the content data base 114.

Also based on the usage rule files 162-1 to 162-N recorded in the content data base 114, the move management program 134 moves contents stored in the content files 161-1 to 161-N to any of the portable device 6, or contents from the portable device 6 to the content data base 114.

The encryption method conversion program 135 converts, to the same encryption method as that used with the contents stored in the content files 161-1 to 161-N recorded in the content data base 114, the encryption method used with a content the purchase application program 115 receives from the EMD server 4-1 via the network 2, a content the purchase program 144 receives from the EMD server 4-2 via the network 3.

The compression method conversion program 136 converts, to the same compression method as that used with the contents stored in the content files 161-1 to 161-N recorded in the content data base 114, the compression method used with a content the purchase application program 115 receives from the EMD server 4-1 via the network 2, a content the purchase program 144 receives from the EMD server 4-2 via the network 2.

The encryption program 137 is used to encrypt a content (not encrypted) read from a CD and supplied from a recording program 113 for example to the same encryption method as that used with contents stored in the content files 161-1 to 161-N recorded in the content data base 114.

The compression/expansion program 138 encodes a content (not compressed) read from a CD and supplied from the recording program 113 by the same encoding method as that used with contents stored in the content files 161-1 to 161-N recorded in the content data base 114. In addition, the compression/expansion program 138 will expand (decrypt) a coded content.

The usage rule conversion program 139 converts, to the same format as that of the usage rule stored in the usage rule files 162-1 to 162-N recorded in the content data base 114, a usage rule for a content the purchase application program 115 receives from the EMD server 4-1 via the network 2, a content the purchase program 144 receives from the EMD sever 4-2 via the network 2.

Before execution of content copy, move, check-in or check-out, the usage rule management program 140 detects a falsification or alteration of the usage rules based on hash values (which will further be described later) meeting the usage rules stored in the usage rule files 162-1 to 162-N recorded in the content data base 114. As the usage rules stored in the usage rule files 162-1 to 162-N recorded in the content data base 114 are updated along with a content copy, move, check-in or check-out, the usage rule management program 140 updates the hash values meeting the usage rules.

The authentication program 141 executes a mutual authentication between the content management program 111 and purchase application program 111, and a mutual authentication between the content management program 115 and purchase program 144. Also, the authentication program 141 will store an authenticate key used in the mutual authentication between the EMD server 4-3 and purchase program 145.

It should be noted that when the content management program 111 is installed in the personal computer 1, the authenticate key the authentication program 141 used in the mutual authentication is not yet stored in the authentication program 141 but when a display/operation-instructive program 112 has successfully registered the authenticate key, the key will be supplied from the EMD registration server 3 and stored in the authentication program 141.

The decryption program 142 decrypts a content when the personal computer 1 plays back the content stored in the content files 161-1 to 161-N recorded in the content data base 114. When checking out a predetermined content to the portable device 6 or checking in a predetermined content from the portable device 6, the PD driver 143 supplies the portable device 6 with the content or a command making the portable device 6 do a predetermined operation.

The purchase program 144 is installed along with the content management program 111 into the personal computer 1, supplied from the EMD registration server 3 via the network 2, or supplied as recorded in a predetermined CD. When installed in the personal computer 1, the purchase program 144 will transmit or receive the content management program 111 and data via an interface of a predetermined form the content management program 111 has.

The purchase program 144 is composed of shuffled or encrypted instructions, for example, to conceal the instructed operations from outside to make it difficult to interpret the instructions (for example, even if the user can read directly the purchase program 144, he cannot identify the instructions.

The purchase program 144 requests, via the network 2, the EMD server 4-2 to send a predetermined content and thus receives the content from the EMD server 4-2. Upon reception of the content from the EMD server 4-2, the purchase program 144 will account for the content.

The purchase program 145 is to be installed along with the content management program 111. It requests, via the network 2, the EMD server 4-3 to send a predetermined content and thus receives the content from the EMD server 4-3. Upon reception of the content from the EMD server 4-3, the purchase program 145 will account for the content.

Based on a filtering data file 181, display data file 182, image files 183-1 to 183-K or a history data file 184, the display/operation-instructive program 112 displays an image of a predetermined window on the display unit 20, and gives a check-in or check-out instruction to the content management program 111 in response to an operation of the keyboard 18 or mouse 19 by the user.

The filtering data file 181 stores data for weighting contents stored in the content files 161-1 to 161-N recorded in the content data base 114, and is recorded in the HDD 21.

The display data file 182 stores data corresponding to the contents stored in the content files 161-1 to 161-N recorded in the content data base 114, and is recorded in the HDD 21.

The image files 183-1 to 183-K store images corresponding to the content files 161-1 to 161-N recorded in the content data base 114 or images corresponding to packages which will further be described later, and are recorded in the HDD 21.

The image files 183-1 to 183-K will be referred to simply as "image file 183" hereafter wherever they have not be referred to individually.

The history data file 184 stores history data including a number of times the contents stored in the content files 161-1 to 161-N recorded in the content data base 114 have been checked out, a number of times the contents have been checked in, and the dates on which the check-out an check-in were made. The history data file 184 is recorded in the HDD 21.

For the registration, the display/operation-instructive program 112 transmits, via the network, an ID of the pre-stored content management program 111 to the EMD registration server 3, while receiving, via the network 2, the authenticate key and EMD selection program 131 from the EMD registration server 3 and supplying them to the content management program 111.

The recording program 113 is used to display an image of a predetermined window, and read data such as a recording time of a content from a CD being the optical disc 42 set in the drive 22 in this embodiment in response to an operation of the keyboard 18 or mouse 19 by the user.

Based on a recording time of a content recorded in a CD, the recording program 113 requests, via the network 2, the WWW server 5-1 or 5-2 to send data corresponding to the CD such as album name or artist's name or data corresponding to a content recorded in the CD such as a music piece title, and thus receives, via the network 2, the data corresponding to the CD or the content recorded in the CD from the WWW server 5-1 or 5-2.

Also, the recording program 113 supplies the display/operation-instructive program 112 with the received data corresponding to the CD or data corresponding to the content recorded in the CD.

Further, when supplied with a recording instruction, the recording program 113 reads and outputs to the content management program 111 a content from a CD being the optical disc 42 set in the drive 22 in this embodiment.

The content data base 114 stores into any of the content files 161-1 to 161-N a content supplied from the content management program 111 and having been compressed in a predetermined manner and encrypted in a predetermined manner (records the content into the HDD 21). The content data base 114 stores usage rules for contents stored in the content files 161-1 to 161-N into any of the usage rule files 162-1 to 162-N corresponding to the content files 161-1 to 161-N in which the contents are stored (records the usage rules into the HDD 21).

The content data base 114 may record the content files 161-1 to 161-N or usage rule files 162-1 to 162-N as records.

A usage rule for a content stored in the content file 161-1 for example is stored in the usage rule file 162-1. A usage rule for a content stored in the content file 161-N is stored in the usage rule file 162-N.

The content files 161-1 to 161-N will be referred to simply as "content file 161" hereinafter wherever they have not be referred to individually. Also, the usage rule files 162-1 to 162-N will be referred to simply as "usage rule file 162" hereafter wherever they have not to be referred to individually.

The purchase application program 115 is supplied from the EMD registration server 3 via the network 2 or as recorded in a predetermined CD-ROM. The purchase application program 115 requests, via the network 2, the EMD server 4-1 to send a predetermined content, while thus receiving the content from the EMD server 4-1 and supplying it to the content management program 111. Also, upon reception of the content from the EMD server 4-1, the purchase application program 115 will account for the content.

Next, the correspondence between data stored in the display data file 82 and the content files 161-1 to 161-N stored in the content data base 114 will be described herebelow:

Firstly, a content stored in any of the content files 161-1 to 161-N belongs to a predetermined package. More specifically, the package is any of an original package, my selected package and filtering package.

Of the above packages, the original package has more than one content belonging thereto. This package corresponds to the content classification (namely, so-called album) in the EMD server 4 or to one CD. A content belongs to any original package and cannot belong to a plurality of original packages. Also, an original package to which a content belongs cannot be modified. The user can edit a part of information corresponding to an original package (for example, addition of information or change of added information).

More than one content freely selected by the user belong to the my selected package. The user can arbitrarily edit contents for assignment to my selected packages, respectively. A content can belong to more than one my selected package at a time. Also, a content may not belong to any my selected package.

Contents selected based on a filtering data stored in a filtering data file 181 belong to the filtering package. The filtering data is supplied from the EMD server 4 or WWW server 5 via the network 2 or as recorded in a predetermined CD. The user can edit the filtering data stored in the filtering data file 181.

The filtering data is a reference for selection of a predetermined content or for calculation of a weight corresponding to the content. For example, filtering data corresponding to top tens of the weekly J-POP (Japanese pops) can be used by the personal computer 1 to identify contents of the weekly Japan Pops Nos. 1 to 10.

The filtering data file 181 includes a filtering data for selection of contents in the descending order of the lengths of period for which they have been checked out for the past one month, a filtering data for selection of contents in the descending order of the numbers of times they have been checked out for the past half year, or a filtering data for selection of contents in which a character "AI (love)" is included in the music piece titles (content name).

Thus, contents in the filtering package are selected by comparing a filtering data with a content display data 221 (including data the user has set), a history data 184 or the like.

The driver 117 drives the audio input/output interface 24 under the control of the content management program 111 or the like to input a content being a digital data supplied from outside and supply it to the content management program 111, output as a digital data a content supplied from the content data base 114 via the content management program 111, or output an analog signal corresponding to a content supplied from the content data base 114 via the content management program 111.

Figure 5:
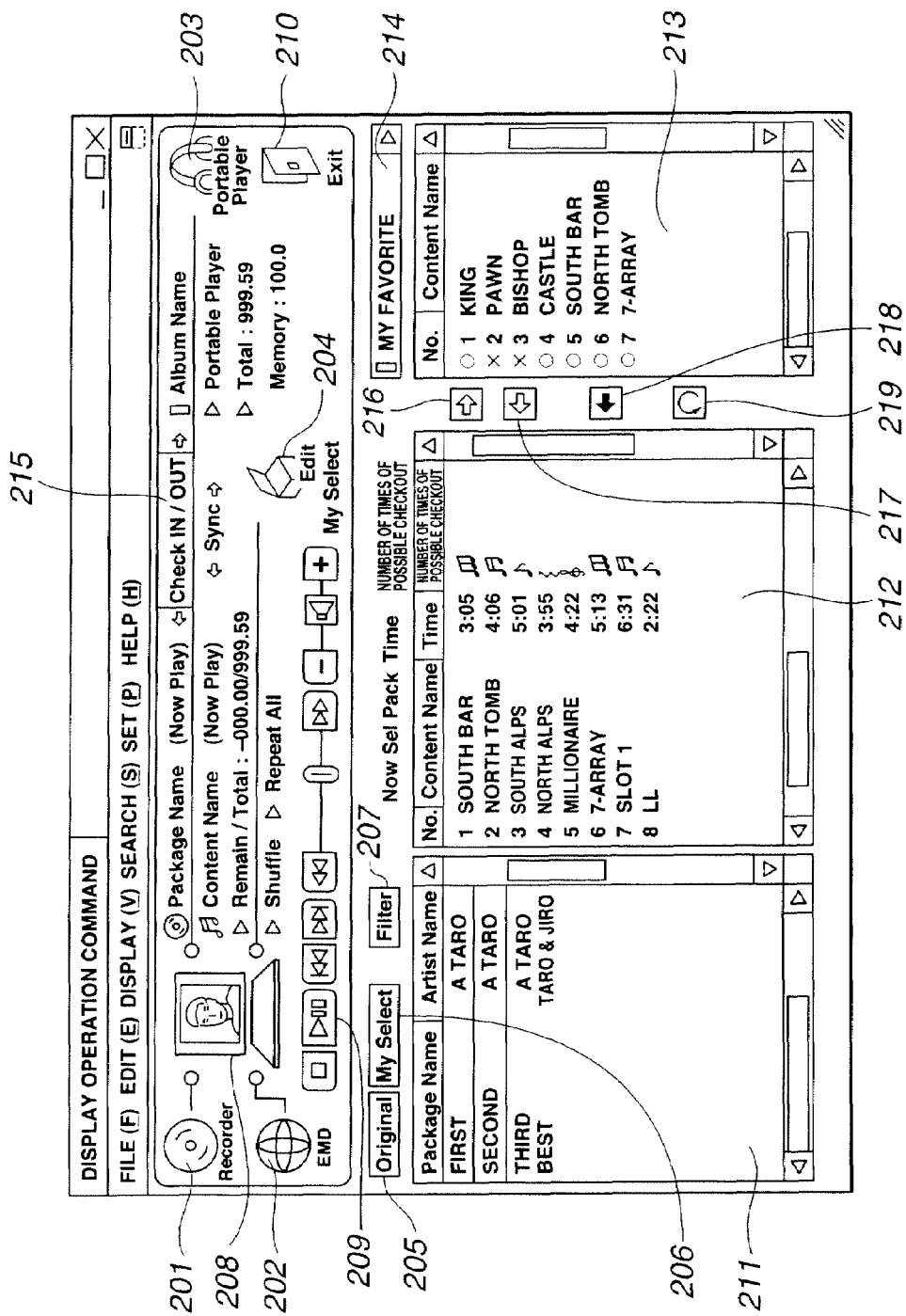
FIG. 5 shows an example of display/operation-instructive window.

FIG. 5 shows an example of the display/operation-instructive window the display/operation-instructive program 112 makes the display unit 20 display.

There are displayed in the display/operation-instructive window a button 201 for starting up the recording program 113, a button 202 for starting up the EMD selection program 131, a button 203 for displaying a field in which check-in or check-out is set, a button 204 for displaying a field in which a my selected package is to be edited, etc.

When a button 205 is selected, data corresponding to an original package is displayed in a field 211 of the window. When a button 206 is selected, data corresponding to a my selected package is displayed in the field 211. When a button 207 is selected, data corresponding to a filtering package is displayed in the field 211.

Data displayed in the field 211 concerns a package. For example, it is a package name or an artist's name.

As shown in FIG. 5, there are displayed in the field 211 a package name "FIRST" and artist's name "A TARO", a package name "SECOND" and artist's name "A TARO", etc.

The display/operation-instructive window has also a field 212 in which there is displayed data corresponding to a content belonging to a packet selected in the field 211. Data displayed in the field is a music piece title, playing time or a number of times the content can be checked out.

In FIG. 5, a package corresponding to the package name "SECOND" is selected. So, there are displayed in the field 212 the music piece title (content name) "MINAMI-NO-SAKABA" corresponding to the content belonging to the package corresponding to the package name "SECOND", a number of times the content can be checked out (for example, one eighth note is for one check-out and two eighth notes are for two check-out's), and music piece title (content name) "KITA-NO-HAKABA" and number of times the content can be checked (for example, one eighth note corresponds to one check-out).

Thus, one eighth note as a number of times a content can be checked out, displayed in the field 212, indicates that a corresponding content can be checked out once.

A rest as a number of times a content can be checked out, displayed in the field 212, indicates that a corresponding content cannot be checked out (the number of check-out's is zero; however, the personal computer 1 can play back that content). A C clef as a number of times a content can be checked out, displayed in the field 212, indicates that the number of check-out's for a corresponding content is limitless (the content can be checked out any number of times).

Note that the number of times a content can be checked out may be indicated with a corresponding number of pieces of a predetermined figure (for example, it may be a circle, star, crescent or the like) as shown in FIG. 5 as well as a number.

Also there is displayed in the display/operation-instructive window a field 208 in which an image or the like corresponding to a selected package or content (corresponding to any of the image files 183-1 to 183-K in FIG. 4) is displayed. In this field, a button 209 is clicked when playing back a selected content (outputting a sound corresponding to the content to the speaker 45).

When a music piece title of a predetermined content (content name) displayed in the field 212 is selected and a deleting operation is made while the button 205 is selected and data corresponding to an original package is being displayed in the field 211, the display/operation-instructive program 112 will make the content management program 111 delete the predetermined content stored in the content data base 114, corresponding to the selected music piece title.

When a content read from a CD is recorded into the content data base 114 while a button 255 (which will further be described later) in the window displayed under the control of the recording program 113 is being selected (made active), the display/operation-instructive program 112 will make the display/operation-instructive window display a field 213 in which there is displayed a music piece title of a content (content name) stored in the pre-designated portable device 6.

When a content read from a CD is recorded into the content data base 114 while a button 255 (which will further be described later) in the window displayed under the control of the recording program 113 is being selected (made active), the display/operation-instructive program 112 will make the content management program 111 check out the content recorded in the content data base 114 and read from the CD to the pre-designated portable device 6.

There is displayed in the field 213 at the leftmost position thereof corresponding to the music piece title of a content (content name) a symbol indicating whether the content can be checked in to the personal computer 1. For example, a symbol "○" at the leftmost position of the field 213 indicates that a content corresponding to a music piece title of a content can be checked in to the personal computer 1 (that is, it has been checked out from the personal computer 1). A symbol "x" at the leftmost position of the field 213 indicates that a content corresponding to a music piece title of a content cannot be checked in to the personal computer 1 (that is, it has not been checked out from the personal computer 1; for example, it has been checked out from any other personal computer).

When the display/operation-instructive program 112 has displayed the field 213 in the display/operation-instructive window, the display/operation-instructive program 112 will display in the display/operation-instructive window a field 214 in which the name of a portable package (to which a content stored in the pre-designated portable device 6 belongs) is displayed, a button 210 to close the field 213, and a button 215 to execute a check-in or check-out operation.

Further, when the display/operation-instructive program 112 has displayed the field 213 in the display/operation-instructive window, the display/operation-instructive program 112 will display in the display/operation-instructive window a button 216 to set a check-out operation for a content corresponding to a music piece title selected in the field 212, a button 217 to set a check-in operation for a content corresponding to a music piece title selected in the field 213, a button 218 to set a check-in operation for all contents corresponding to content names displayed in the field 213, and a button 219 to cancel the check-in or check-out setting.

Even with the check-in or check-out setting made by using the buttons 216 to 219, however, the personal computer 1 will not execute the check-in or check-out operation.

When the button 215 is clicked after a check-in or check-out is set by using the buttons 216 to 219, the display/operation-instructive program 112 will make the content management program 111 execute the check-in or check-out. That is to say, when the button 215 is clicked, the display/operation-instructive program 112 will make, based on the check-in or check-out setting, the content management program 111 transmit a content, or a command to erase a predetermined content corresponding to the check-in setting (e.g., a command to erase a predetermined content stored in the portable device 6), to the portable device 6, and to update the usage rule stored in the usage rule file 162 corresponding to the content or command thus transmitted.

When the check-in or check-out is executed, the display/operation-instructive program 112 will respond to the transmitted content or command to update the history data stored in the history data file 184. The history data includes information for identification of a content having been checked in or out or a date when the content has been checked in or out, and the name of the portable device 6 from which the content has been checked out.

Since the check-in or check-out can be set in a short time, the user can quickly know the status after execution of a check-in or check-out operation, whereby the number of times a time-taking check-in or check-out operation is done can be reduced to minimize the total time (including the setting and execution of a check-in or check-out operation) taken for the check-in or check-out procedure.

Figure 6:
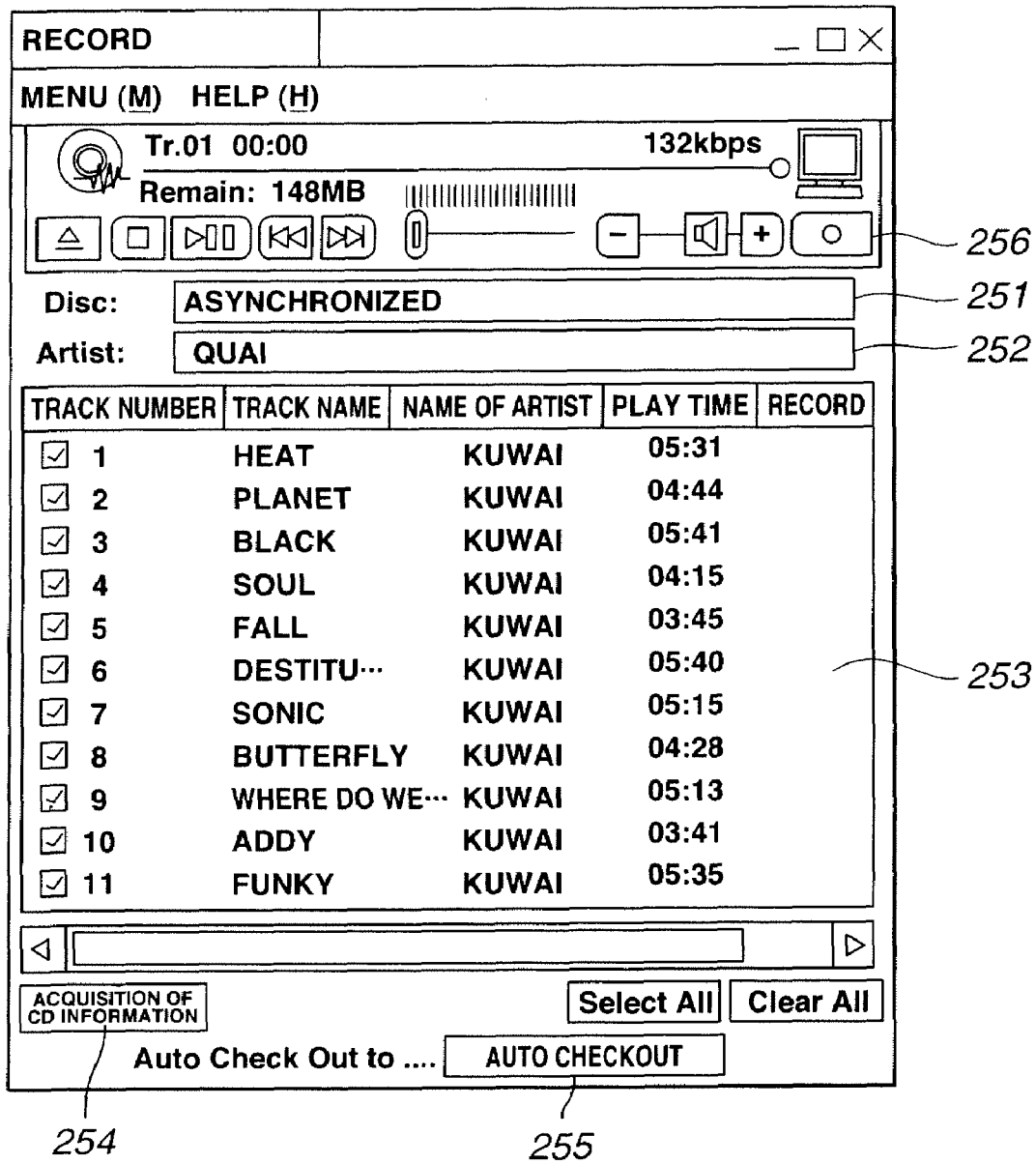
FIG. 6 shows an example of the window which the recording program makes the display unit display.

FIG. 6 shows an example of the window which the recording program 113 makes the display unit 20 display.

Based on CD information received from the WWW server 5-2 for example, the recording program 113 will display a CD title such as "ACYNCHRONIZED" in a field 251. Also, based on CD information received from the WWW server 5-2, the recording program 113 will display an artist's name such as "KUWAI" in a field 252.

Based on CD information received from the WWW server 5-2, the recording program 113 will display titles of music pieces such as "HEAT", "PLANET", "BLACK", "SOUL", etc. in a region of a field 253 where music piece titles are to be displayed. Similarly, the recording program 113 will display an artist's name such as "KUWAI" is a region of the field 253 where artists' names are to be displayed.

After receiving a predetermined CD information, the recording program 113 will store it into a predetermined directory in the HDD 21.

Upon reception of an instruction for acquisition of CD information via clicking of a button 254, the recording program 113 will first search the predetermined directory in the HDD 21. When the CD information is found stored in the directory, the recording program 113 will display a dialogue box (not shown) to prompt the user for selection of whether he or she is going to use the CD information stored in the directory.

When a button 256 displayed in the window displayed by the recording program 113 and which instructs to start recording of a content, is clicked, the recording program 113 will read a content from a CD set in the drive 22, and supply it along with the CD information to the content management program 111. The compression/expansion program 138 of the content management program 111 compresses the content supplied from the recording program 113 in a predetermined manner, and the encryption program 137 encrypts the compressed content. Also, the usage rule conversion program 139 generates a usage rule for the compressed and encrypted content.

The content management program 111 will supply the compressed and encrypted content along with the usage rule to the content data base 114.

The content data base 114 will generate a content file 161 and usage rule file 162 for the content received from the content management program 111, and store the content into the content file 161 and the usage rule into the usage rule file 162.

When the content and usage rule for the content are stored into the content data base 114, the content management program 111 will supply the CD information and usage rule received from the recording program 113 to the display/operation-instructive program 112.

The display/operation-instructive program 112 will display data for storage into the display data file 182 according to the usage rule for the content stored in the content data base 114 by the recording and the CD information.

The window displayed by the recording program 113 has displayed therein a button 255 to automatically set whether the portable device is made to check out a content read from the CD when the content read from the CD is recorded into the content data base 114.

For example, when the button 255 is clicked, the recording program 113 will display a pull-down menu showing the portable device 6. When the user selects the portable device 6 from the pull-down menu, the personal computer 1 will automatically check out the content recorded from the CD to the selected portable device 6. When the user selects "NOT CHECK OUT" from the pull-down menu, the personal computer 1 will not check out the content recorded from the CD.

Thus, when the content read from the CD is recorded into the content data base 114 with only the button 255 in the window displayed by the recording program 113 being set active, the personal computer 1 can make any pre-designated one of the portable devices 6-1 to 6-3 check out the content read from the CD.

(2) Handling Between Different Formats

Meanwhile, there are numerous contents distributors furnishing the music contents, with the encryption systems of the contents and the formats of the using condition information differing from one distributor to another. So, the user at larger has to purchase contents management applications or portable devices for reproduction or check-in/check-out different from one distributor of contents desired to be furnished to another, and hence the user cannot handle the music contents stored on a personal computer by a sole management application or by a sole portable device.

So, the present system envisages to handle the contents having different formats from one distributor to another on the personal computer 1 in a unified fashion.

Figure 7:
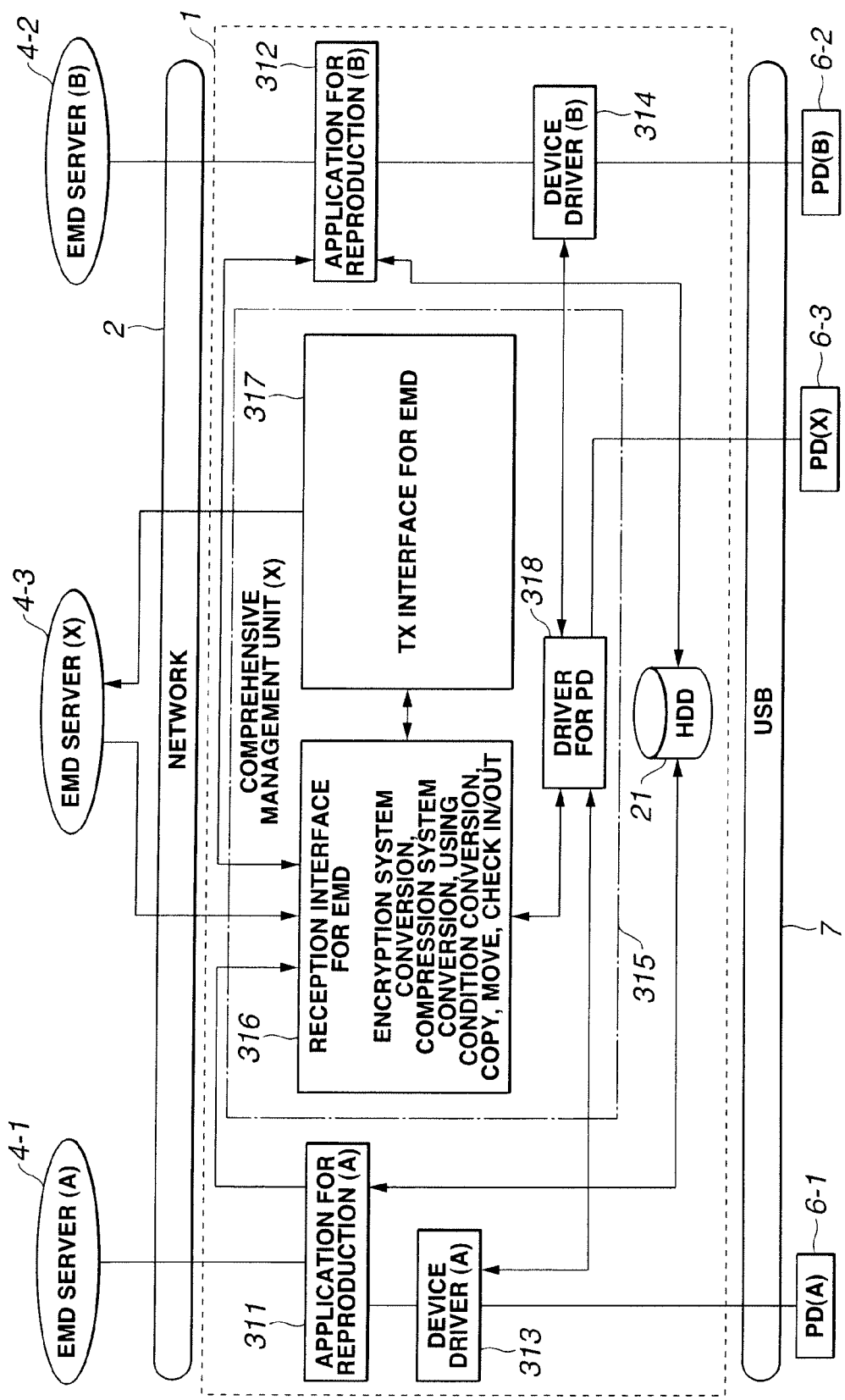
FIG. 7 explains unified handling of contents having different formats from one distributor to another in the music contents distributing system.

Referring to FIG. 7, unified handling of contents having different formats from one distributor to another, in this music contents distributing system, is explained with reference to FIG. 7.

It is assumed that the plural EMD servers 4, connected to the network 2, are an EMD server A4-1, distributing the music contents furnished by a music furnishing firm A, an EMD server B4-2, distributing the music contents furnished by a music furnishing firm B and an EMD server X4-3, distributing the music contents furnished by a music furnishing firm X. These EMD servers 4 (4-1, 4-2 and 4-3) furnish the music contents of a line-up each being unique to each firm, over a network 2 to a personal computer 1 owned by a user. Moreover, the respective EMD servers 4 (4-1, 4-2 and 4-3) distribute the music contents in respective different styles, by the servers 4 adopting encryption systems of music contents, formats of the using condition (usage rule) information, music contents compression systems and charging systems for the motion compensation, which are unique to the servers.

In the personal computer 1, there are installed, as application software for reproduction or management of the music contents, a reproduction application A311, for purchasing, supervising and reproducing music contents from the EMD server A4-1, a reproduction application B312, for purchasing, supervising and reproducing music contents from the EMD server B4-2, a device driver A313 for transferring the music contents to the portable device A6-1 and a device driver B314 for transferring the music contents to the portable device B6-2. Meanwhile, the reproduction application 311, 312, shown in FIG. 7, correspond to the application program 115 for purchase and the driver 117, shown in FIG. 4, respectively.

In the personal computer 1, there are installed a comprehensive management unit X 315, for managing comprehensive control of the totality of music contents stored in the HDD 21. This comprehensive management unit X 315 is made up of a reception interface 316 for EMD, a transmission interface for EMD 317 and a driver for PD 318.

It is assumed here that the portable device A6-1 is a dedicated device for coping with a music furnishing firm A, the portable device B6-2 is a dedicated device for coping with a music furnishing firm B and the portable device X6-3 is a dedicated device for coping with a music furnishing firm X. It is also assumed that the music contents stored in a memory card are encrypted in accordance with an encryption system unique to each music furnishing firm, with the formats for the using condition information or the compression systems being also different, so that no music contents can be transferred on connection directly e.g., to other device drivers.

The reproduction application A 311 performs the processing for connecting to the EMD server, uploading e.g., a log file and downloading music contents, contents keys and using condition information. This reproduction application A311 is adapted for performing connection processing only to the EMD server the application is able to cope with. Here, the reproduction application A311 is adapted for performing the processing associated with the EMD server 4-1, while it is unable to perform connection processing to any other EMD servers. The reproduction application A311 also is adapted for performing the processing for authentication on connection to the EMD server A 4-1, the processing for authentication on connection to the portable device A6-1 and the processing for encryption/decryption of the music contents and the using condition information stored in the HDD 21. The reproduction application A311 encrypts the music contents, downloaded from the EMD server 4-1 and the corresponding using condition information with the contents key and encrypts the contents key with the session key to store the encrypted key in the HDD 21. Meanwhile, the respective reproduction applications adopt respective unique encryption systems, so that the music contents stored in the same HDD 21 in the personal computer 1 cannot decrypt other reproduction applications than the dedicated reproduction application.

The reproduction application A311 also manages the using condition information appended to each music contents. For example, if a limit value for the number of times of reproduction is stated in the using condition information, such that limitations are imposed on the number of times of possible contents reproduction, the reproduction application A311 decrements the limit value of the number of times of reproduction or duplication by 1 for each reproduction or duplication.

The reproduction application A311 also transmits the music contents and the using condition information it manages on the HDD 21 to the reception interface 316 for EMD of the comprehensive management unit X 315.

The reproduction application B312 performs the processing of connection to the EMD server, uploading e.g., a log file and downloading the music contents, contents key or the using condition information. This reproduction application B312 is adapted for performing the processing for connection only to the EMD server the application is able to cope with. Specifically, the reproduction application B312 is able to perform the processing associated with the EMD server 4-2, while it is unable to perform the processing for connection to the other EMD servers. The reproduction application B312 performs the processing for authentication on connection to the EMD server 4-2, the processing for authentication on connection to the portable device B6-2 and the processing for encrypting/decrypting the music contents and the using condition information stored in the HDD 21. For example, the reproduction application B312 encrypts the music contents downloaded from the EMD server 4-2 and the corresponding using condition information, with the contents key, while encrypting the contents key with a session key and saving the encrypted contents key in the HDD 21.

The reproduction application B312 also manages the using condition information appended to the respective music contents. For example, if a limit value for the number of times of reproduction is stated in the using condition information, such that limitations are imposed on the number of times of possible contents reproduction, the reproduction application B312 decrements the limit value of the number of times of reproduction or duplication by 1 for each reproduction or duplication.

The reproduction application B312 also transmits the music contents and the using condition information it manages on the HDD 21 to the reception interface 316 for EMD of the comprehensive management unit X 315.

The device driver A313 is an application software for transferring music contents to the portable device A6-1. The device driver. A313 transmits the music contents to the portable device A6-1.

The device driver B314 is an application software for transferring music contents to the portable device B6-2. The device driver B314 transmits the music contents to the portable device B6-2.

The comprehensive management unit (X)315 is an application software, dedicated to the music furnishing company X, and which is furnished with the music contents from the EMD server (X) 4-3. The comprehensive management unit (X)315 is also a supervising software for transferring the music contents and the using condition information between it and the device driver (A) 313, device driver (B) 314, reproducing application (A) 311 and the reproducing application (B) 312 to manage the music contents in the personal computer 1 comprehensively. The comprehensive management unit (X)315 is also able to transfer the music contents it is supervising to the dedicated portable device 6-3 which is the portable music reproduction device.

The comprehensive management unit (X)315 performs processing corresponding to the content management program 111 shown in FIG. 4.

The projection display unit 318 is an interfacing module for connection to the portable device 6-3 and executes the authentication processing and the encryption processing between it and the portable device 6-3. Moreover, in transferring music contents etc to other portable devices 6-1, 6-2, the projection display unit 318 transfers the music contents and the using condition information through the device driver (A) 313 or the device driver (B) 314.

The reception interface for EMD 316 receives the music contents and the using condition information from the reproducing application (A) 311 and the reproducing application (B) 312, while receiving the music contents and the using condition information transferred from the EMD server (X) 4-3 through the network 2 and exchanging the music contents and the using condition information with the PD driver 318.

In receiving the music contents and the using condition information from the reproducing application (A) 311 and the reproducing application (B) 312, the reception interface for EMD 316 performs reciprocal authentication, conversion of the encryption system, conversion of the format for the using condition information etc., appended to the music contents being transferred and conversion of the compression system of the music contents being transferred. The encryption system, using condition information or the compression system used by the reproducing application (A) 311 and the reproducing application (B) 312 is changed to the system used by the comprehensive management unit (X)315. The system used by the comprehensive management unit (X)315 is referred to below as a unified transfer protocol. The reception interface for EMD 316 transmits the music contents and the using condition information, thus converted to the unified transfer protocol, the device driver (A) 313 or the device driver (B) 314 through the PD driver 318. The reception interface for EMD 316 also transmits the music contents and the using condition information, converted to the unified transfer protocol, to the portable device 6-3 through the PD driver 318.

The music contents provided from the EMD server (A) 4-1 and the EMD server (B) 4-2 are once downloaded by the reproducing application (A) 311 and the reproducing application (B) 312, and the encryption system, the compression system, and the using condition information of the music contents are converted to the unified transfer protocol and are transferred to the comprehensive management unit (X)315. The comprehensive management unit (X)315 comprehensively supervises the music contents of the contents furnishing companies downloaded from the EMD server (A) 4-1, EMD server (B) 4-2 and from the EMD server (X) 4-3.

The reception interface for EMD 316 also has the function of copying, moving, and performing check-in and check-out of the music contents.

The reception interface for EMD 316 performs the processing of copying or moving the music contents stored in the reproducing application (A) 311 to the reproducing application (B) 312, in accordance with the command for copying or movement from the user. At this time, the reception interface for EMD 316 converts the encryption system of the music contents, compression system or the statement format of the use conditions into the unified transfer protocol.

The reception interface for EMD 316 also performs the processing of copying and checking-in the music contents stored in external media, such as Compact Disc, or in the portable devices 6-1 to 6-3, into the comprehensive management unit (X)315, in accordance with the CD ripping command or the check-in command from the user. If, at this time, the encryption system or the compression system of the music contents or the description format of the using conditions are not converted to the unified transfer protocol, the reception interface for EMD 316 makes the conversion into the unified transfer protocol.

The reception interface for EMD 316 also performs the processing of recording the music contents managed by the comprehensive management unit (X)315 in the portable device 6-3 in accordance with a check-out command from the user. If, at this time, the encryption system or the compression system of the music contents or the description format of the using conditions are not converted to the unified transfer protocol, the reception interface for EMD 316 makes the conversion into the unified transfer protocol. Also, at this moment, the available number of check-out of the using condition is decreased by one.

Figure 8:
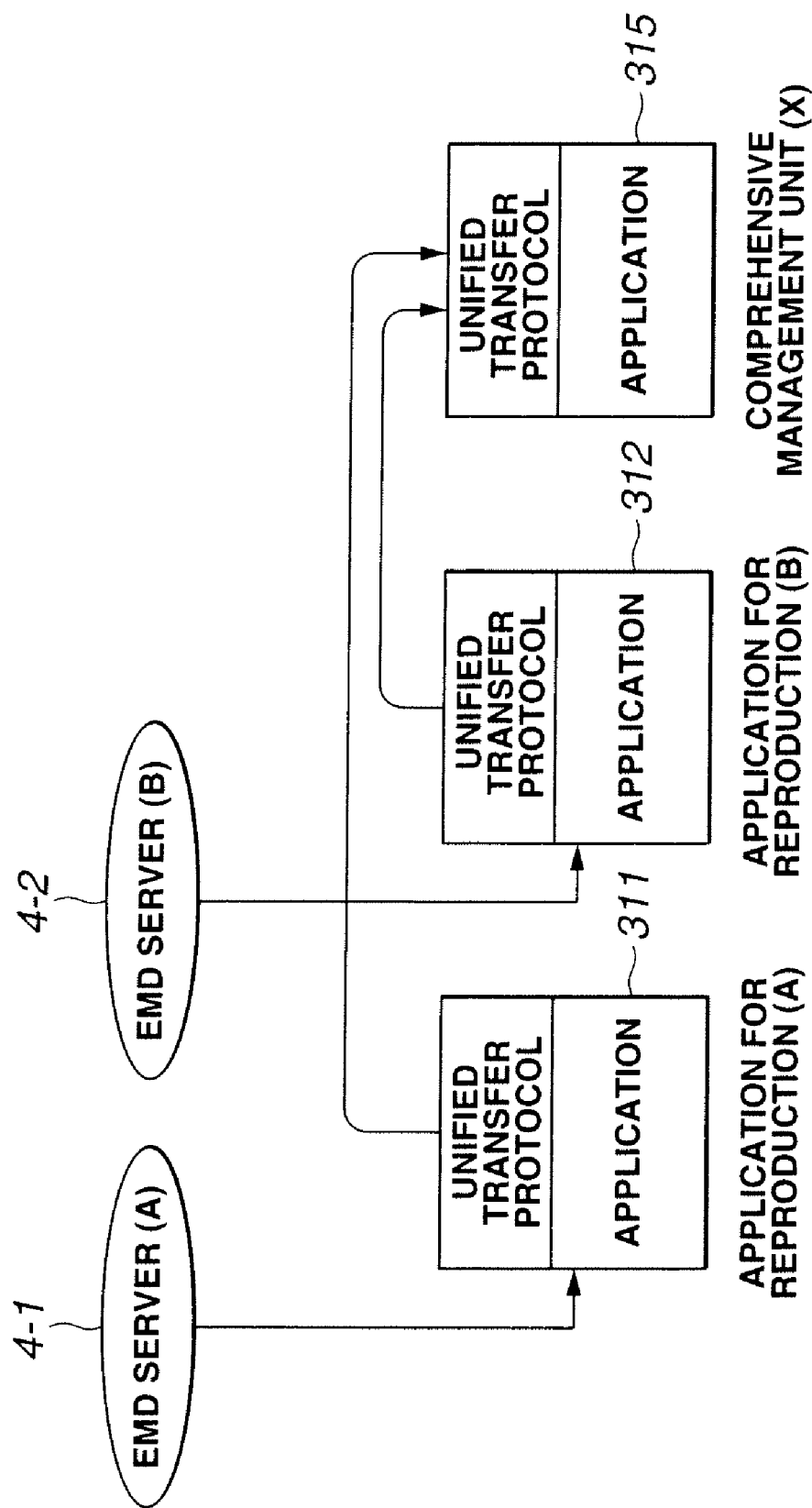
FIG. 8 illustrates the relation between a unified transfer protocol layer and an application layer.

The comprehensive management unit (X)315 has the unified transfer protocol in a lower application layer in which to transfer data to other purchase applications, as shown in FIG. 8. The comprehensive management unit (X)315 has data transmission/reception with the EMD server (X) 4-3, with a layer below the unified transfer protocol as http (hyper text transfer protocol).

In the above-described music contents distributing system, the music contents distributed from the EMD server (A) 4-1 and the EMD server (B) 4-2 are acquired by the comprehensive management unit (X)315 for reproduction or management. Also, the music contents distributed from the EMD server (X) 4-3, EMD server (A) 4-1 and the EMD server (B) 4-2 are transferred to the portable device (X) 6-3.

In the music contents distributing system, as described above, mainly the comprehensive management unit (X)315 operates to convert the encryption system for music contents to be transferred, the format of the using condition information appended to the music contents to be transferred or the compression system of the music contents to be transferred, in association with the respective reproducing applications and the device drivers, to effectuate transfer of the music contents with the aid of the unified transfer protocol. So, the music contents downloaded by the reproducing application (A) 311 from the EMD server (A) 4-1 and the music contents downloaded by the reproducing application (B) 312 from the EMD server (B) 4-2 can be transferred to the comprehensive management unit (X)315 so that the music contents of an artist furnished only by e.g., the music furnishing company A can be transferred to the portable device (X) 6-3. That is, since the present music contents distributing system converts the encryption system of music contents, format of the using condition information and the compression system for the music contents into the unified transfer protocol, the music contents of variable systems, stored in the hard disc of the personal computer 1, can be reproduced by the comprehensive management unit (X)315 or the portable device (X) 6-3. In particular, since the music contents distributing system converts the encryption system and the using condition information at the time of transfer, the degree of freedom in handling the music contents can be enhanced while protection of the copyrights of the music contents is assured.

That is, in the music contents distributing system, at least the encryption system and the using condition information are converted between reproducing applications adapted for reproducing or controlling the music contents to transfer the music contents and the using condition information. By so doing, the music contents distributing system is able to move the music contents stored in e.g., the hard disc 21 in the personal computer 1, even if there are plural reproducing applications, thus enabling unified management of the music contents. Moreover, since the using condition information is transferred along with the music contents, there is no risk of the using conditions overlapping with sole music contents thus assuring more reliable protection of the music contents.

(3) Using Condition Information (Explanation of Routinely Used Using Condition Information)

A typical format of the using condition information used in the reproducing application (A) 311 is now explained.

In the reproducing application (A) 311, the using condition information, represented by a tabulated form shown for example, in FIG. 9a, is used.

In the left and right columns of the Table are stated, in the columnar direction, the policies of the using conditions and specified values of the policies, respectively. For example, the possible replay date (from), replay end date (to) or the cost per replay (pay/play) are stated as policies. The using condition information is distributed from the EMD server (A) 4-1 as the information is appended to each music contents, as shown in FIG. 9B. The reproducing application (A) 311 controls the music contents in accordance with the stated policies and the corresponding values. For example, assume that the possible replay date (from) is Oct. 25, 1999, replay end date (to) is Nov. 24, 1999 and the cost per replay (pay/play) is yes/10 yen. In such case, the music contents can be reproduced as from Oct. 25, 1999 and reproduction thereof before this data is inhibited even if a replay command is issued from the user. The music contents also can be reproduced until Nov. 24, 1999 such that the music contents are erased as from this date. The music contents also are set so that 10 yen is assessed per replay. The number of times of reproduction by the user is stored as the separate log information which is uploaded to the EMD server (A) 4-1 to assess the user who heard or viewed by an amount corresponding to the number of times the music contents are heard or viewed.

(Explanation of the Using Condition Information as Used by the Comprehensive Management unit (X)315)

The using condition information, as used by the comprehensive management unit (X)315, is now explained. The using condition information, now explained, is appended to the music contents downloaded from the EMD server (X) 4-3, and is used when the comprehensive management unit (X)315 manages control of the music contents. Moreover, the using condition information is used as a unified format when reciprocally transferring music contents between the reproducing application (A) 311 and the comprehensive management unit (X)315 or between the reproducing application (A) 311 and the comprehensive management unit (X)315. This using condition information is referred to below as the unified using condition information.

The unified using condition information is made up of an index file 331, an automaton file 332, a parameter file 333 and a hysteresis file 334, as shown in FIG. 4. These files are stated in an XML (eXtensible Markup Language) language.

In the index file 331 is stated e.g., the reference information of each file.

To the automaton file 332 are appended an automaton stating portion 341, stating the using conditions by automaton, an authentication code by contents keys (MAC; Message Authentication Code) 342, a signature by a contents purveyor (Sig) 343 and a certificate for verifying the signature (Cert) 344, as shown in FIG. 11. The contents key is denoted KC, whilst a private key and a public key of the contents purveyor who prepared the contents are denoted $K^{-1}_E$ and $K^1_E$, respectively.

The automaton stating portion 341 describes the operating state of music contents by an Extended State Machine stated in tuple sequence.

With a set of the operating states of the current music contents Q and with a set of input symbols representing the events of the music contents $\Sigma$, the automaton stating portion 341 expresses a set Q' of the operating states of the music contents following status transition as follows:

$$Q'=\{d|d=\delta(q,\alpha)|q \in Q, \alpha \in Q, \delta: Q \times \Sigma \to Q\}$$

As shown in this equation, the set Q' of the operating states is expressed as d. The d is defined by a function $\delta$ having variables q,$\alpha$. The q indicates one operating state of the set Q of the operating states of the music contents. The $\alpha$ indicates an event of the set of events $\Sigma$. The function $\delta$ is a map of a power set of Q and $\Sigma$ to Q.

Based on the above Q, $\Sigma$, and Q', each tuple is expressed by $$\{<q,\alpha,d>|q,d \in Q, \alpha \in \Sigma\}.$$

Note that <q, $\alpha$, d> indicates an example of permutation and combination of q, $\alpha$, d.

In $\Sigma$, events such as replay (play), copy (copy), amount (pay Y), possible play start date and time (from YMD), play end date and time (to YMD), number of usable days (in Ddays), or null event ($\epsilon$), are stated as follows:

$$\Sigma=(\text{Play, copy, pay Y, from YMD, to YMD, in Ddays}, \epsilon).$$

So, the following statement is made in automaton descriptor 341.

A specified statement in the automaton descriptor 341 is hereinafter explained.

Figure 12:
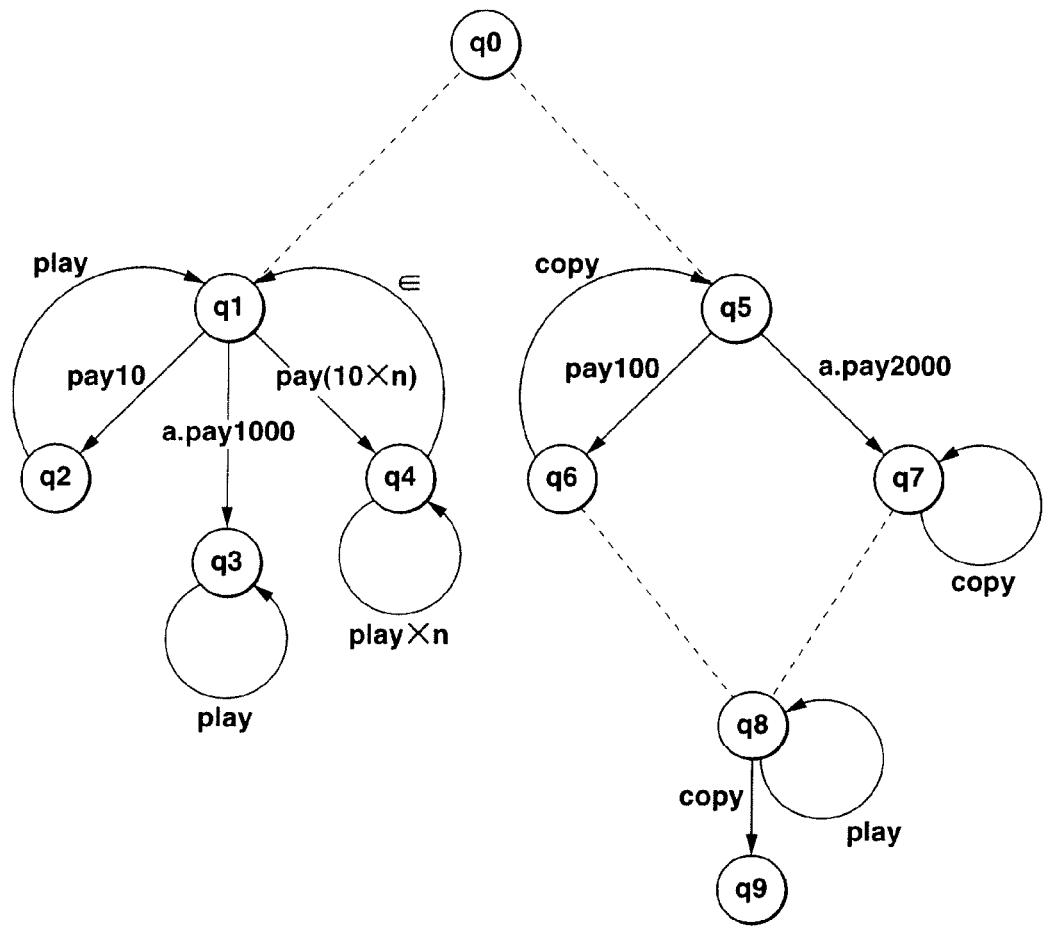
FIG. 12 shows an example of an automaton indicating the operation transition of music contents stated in the automaton stating portion of the automaton file.

An illustrative description by a tuple-row of the automaton, representing operation transition of music contents shown in FIG. 12, is shown in FIG. 13.

This automaton performs the status transitions as now explained.

First, transition is made from an initial state q0 to a state q1 and to a state q5. From the states q1 and q5, parallel movement occurs.

If a payment event of a pre-set amount, such as 10 yen (pay10) occurs in the state q1, transition to the state q2 occurs. If the play event (play) occurs in the state q2, transition is made to the state q1. That is, the present automaton indicates that, if the payment of 10 yen is made, the music contents may be reproduced only once. If a payment event of a pre-set amount, such as 1000 yen (a.pay1000) occurs in the state q1, transition is again made to the status q3. Specifically, this automaton indicates that, if the payment of 100 yen is made, the music contents can be reproduced without regard to the number of times. If a payment event in an amount corresponding to n times the reproduction amount for one reproduction, such as 10 yen (pay10×n) occurs, transition is made to the status q4. If, after transition to the status q4, the play event (play) occurs, transition is again made to this state q4. If n play events occur in this state q4, transition is made to the status q1. That is, in this automaton, it is shown that, if 10×n yen is paid, the music contents can be reproduced n times.

If a payment event of a pre-set amount, such as 100 yen, occurs in the state q5, transition is made to the state q6. If a copy event occurs in the state q6, transition is made to the state q5. If a copy event occurs in the status q6, transition occurs to the status q8. If a play event occurs in the state q8, transition is again made to this state q8. If a copy event occurs in this state q8, transition is made to the state 9. This state q9 is a final state where no transition to other states occurs and no event occurs. That is, this automaton shows that, if 100 yen is paid, the music contents can be copied once to other device. Moreover, this automaton shows that, although the music contents copied can be reproduced any desired number of times, reproduction is impossible if once the music contents are copied to another device.

If the payment event of a pre-set amount, such as 2000 yen (a.pay2000) occurs in the state q5, transition is made to the state q7. If a copy event occurs in the state q7, transition is again made to this state q7. If a copy event occurs in the state q7, transition is made to the state q8. If a play event occurs in the state q8, transition is again made to this state q8. If a copy event occurs in this state q8, transition is made to the state q9. This state q9 is a final state where no transition to other states occurs and no event occurs. That is, this automaton shows that, if 2000 yen is paid, the music contents can be copied to another device a limitless number of times. Moreover, the automaton shows that, although the copied music contents can be reproduced any desired number of times, the music contents, copied to another device, can not be reproduced.

FIG. 13 shows a tuple row statement of the automaton performing the above-described status transitions.

It is possible for the automaton stating portion 341 to state parallel synthesis of operating states, in order to update the movement of music contents. For example, parallel synthesis of the operations $a_0$ and $a_1$ may be represented by the tuple sequence as follows:

$$<q_0, \alpha, a_0, q_0>$$

$$<q_0, \alpha, a_1, q_0>.$$

It is also possible to state an action accompanying the status transition in the automaton stating portion 341. For example, the action is represented by tuple as follows:

$$<q_0, \alpha, q_1; \text{action}>$$

This action is represented as a function employing a pre-defined variable. The variable is made up of an ID, a scope and an initial value. For example, with a variable n representing the purchasing price of an album (a), statement is such that a.n:=1000. An example of the automaton stating portion 341 stating an action with respect to the variable is as shown below:

$$<q_0, \text{pay}100, q_1, a.n:=a.n-100> \quad (1)$$

$$<q_0, \text{pay}(a.n), q_1, a.n:=0> \quad (2)$$

$$<q_1, \text{play}, q_2> \quad (3)$$

This example indicates that the purchasing price of a sole music contents (equation (1)) affects the price of album purchase (equation (2)).

The above-described automaton stating portion 341 is made up of an entry ID 345, a contents ID 346, version information 347, variable information 348, and a tuple sequence 349, as shown in FIG. 14.

A specified example of the automaton stating portion 341 the description format of which has been defined will be described in the following.

Meanwhile, the events and commands used below as the automaton descriptions are defined by a DTD (Document Type Definition) specified on the basis of the XML specification. For example, the reproduction (play), duplication (copy), pay for play (pay-for-play), pay for duplication (pay-for copy), pay for album play (pay-for-album-play), pay for album duplication (pay-for-album-copy), possible use start date (from), use end date (to) and a null operation (null) are set as events by the DTD.

FIG. 16 shows an exemplary description of the automaton stating portion 341 by the XML language indicating that the music contents can be reproduced as from Sep. 1, 1999.

Figure 17:
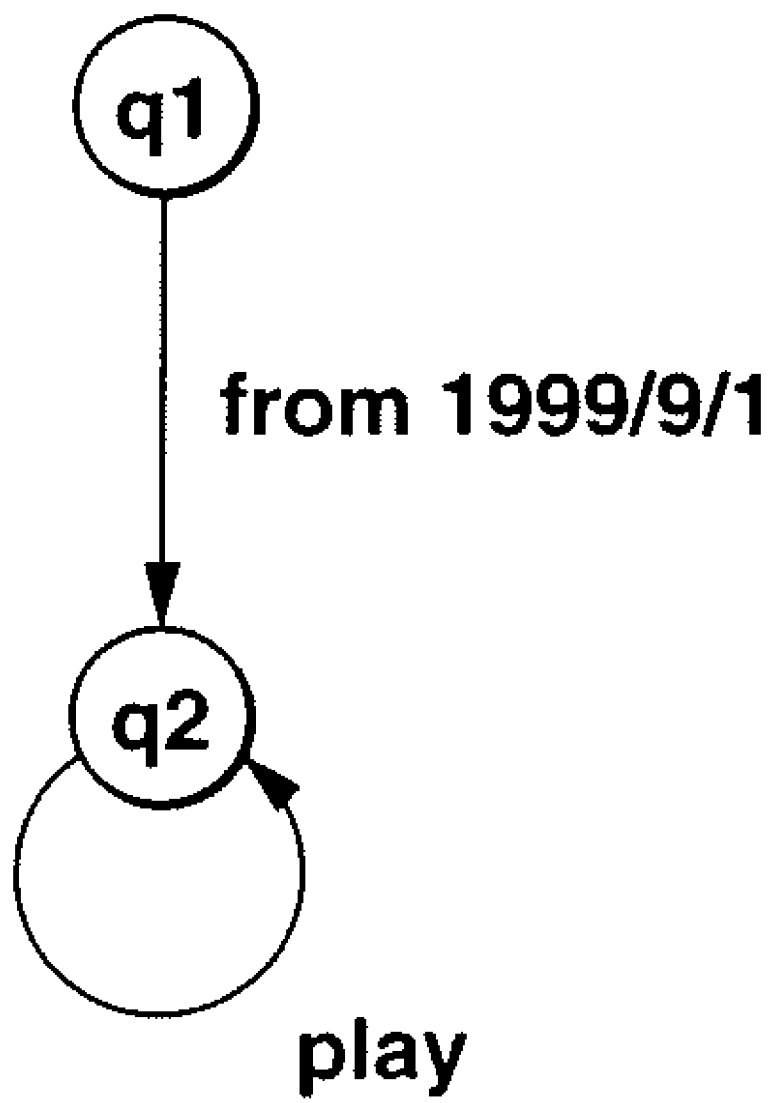
FIG. 17 is a state transition view of the first statement example.

The description shown in FIG. 16 is an automaton shown in FIG. 17. The automaton is constituted by the state q1 as an initial state and the state q2. When the date becomes Sep. 1, 1999 which is a possible use start date (from) in the state q1, the state is moved to the state q2. When the reproduction event (play) is generated in the state q2, the music contents are reproduced, and the state is again moved to the state q2. In such manner, the automaton controls to enable reproduction of the music contents from Sep. 1, 1999.

FIG. 18 shows an exemplary description of the automaton stating portion 341 by the XML language indicating that the music contents can be reproduced until Oct. 31, 1999.

Figure 19:
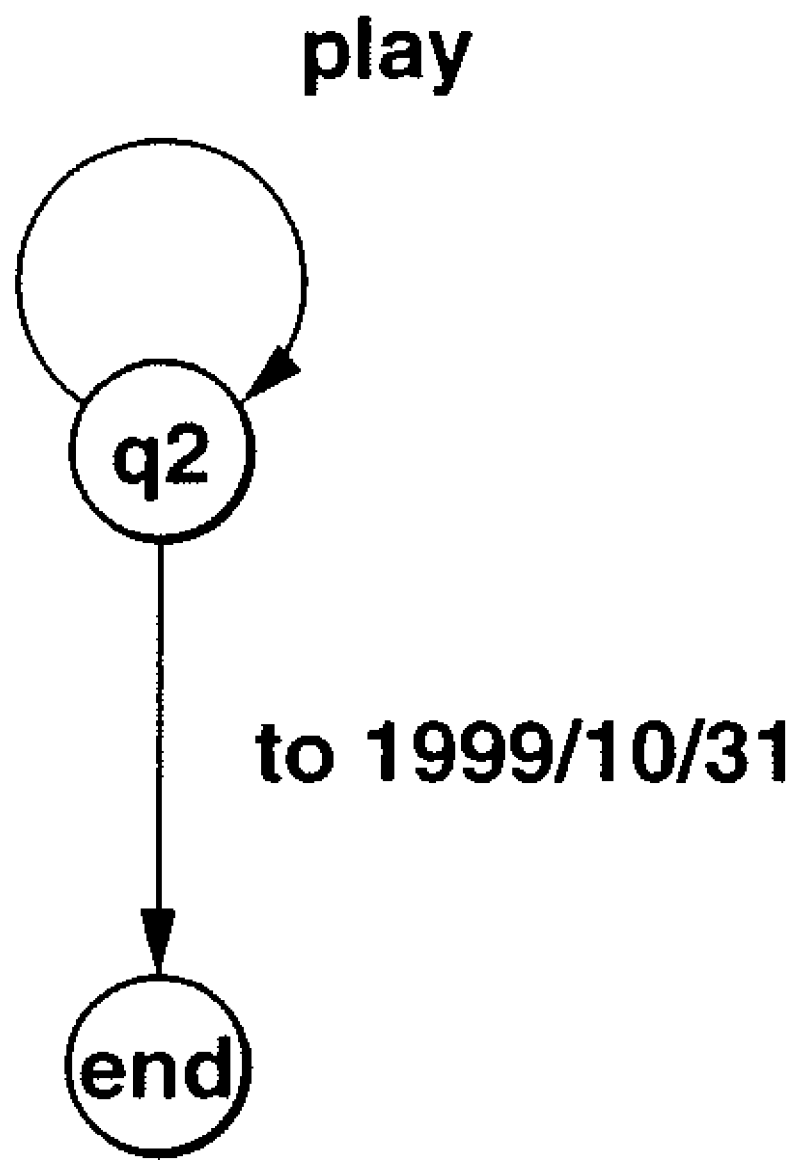
FIG. 19 is a state transition view of the second statement example.

The description shown in FIG. 18 is an automaton shown in FIG. 19. The automaton is constituted by the state q1 as an initial state and the state end as an end state. When the reproduction event (play) is generated in the state q2, the music contents are reproduced, and the state is again moved to the state q2. When the date becomes Oct. 31, 1999 which is a use end date (to) in the state q2, the state is moved to the state end. In the state end, the state is not moved to any state, or no event is generated. In such manner, the automaton controls to enable reproduction of the munic contents until Oct. 31, 1999.

FIG. 20 shows an exemplary description of the automaton stating portion 341 by the XML language indicating that the possible reproduction time period for the music contents is from Sep. 1, 1999 until Oct. 31, 1999, with the number of times of possible reproduction being 16.

Figure 21:
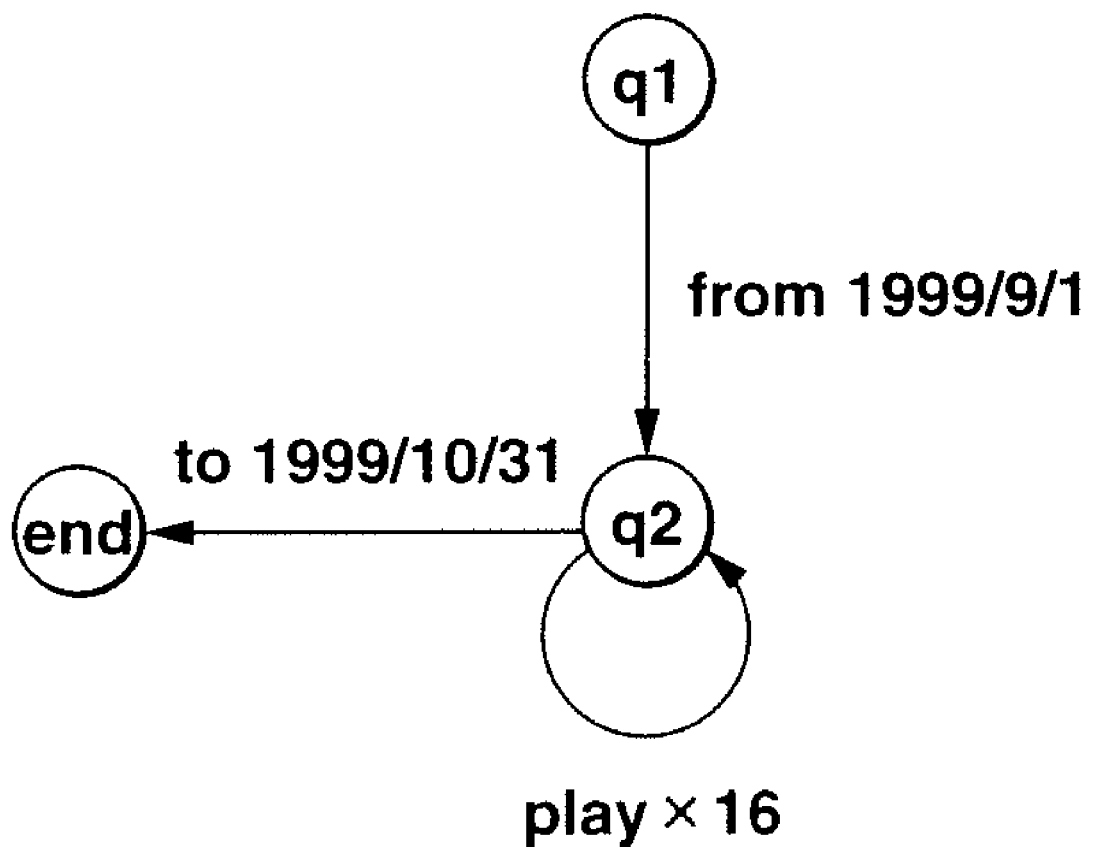
FIG. 21 is a state transition view of the third statement example.

The description shown in FIG. 20 is an automaton shown in FIG. 21. The automaton is constituted by the state q1 as an initial state, the state q2 and the state end as an end state. When the date becomes Sep. 1, 1999 which is a possible use start date (from) in the state q1, the state is moved to the state q2. When the reproduction event (play) is generated in the state q2, the music contents are reproduced, and the state is again moved to the state q2. When the date becomes Oct. 31, 1999 which is a use end date (to) in the state q2, or the reproduction event is generated 16 times (play×16), the state is moved to the state end. In the state end, the state is not moved to any state, or no event is generated. In such manner, the automaton controls to define the reproduction period from Sep. 1, 1999 to Oct. 31, 1999, and to define the number of reproduction to be 16 times.

FIG. 22 shows an exemplary description of the automaton stating portion 341 by the XML language indicating that the number of times of reproduction of the music contents is to be limited to 16.

Figure 23:
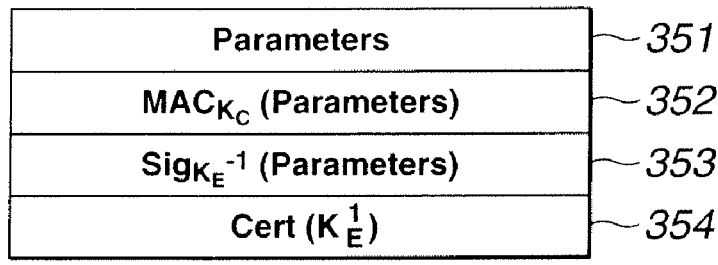
FIG. 23 shows the structure of a parameter file of the unified using condition information.
Figure 24:
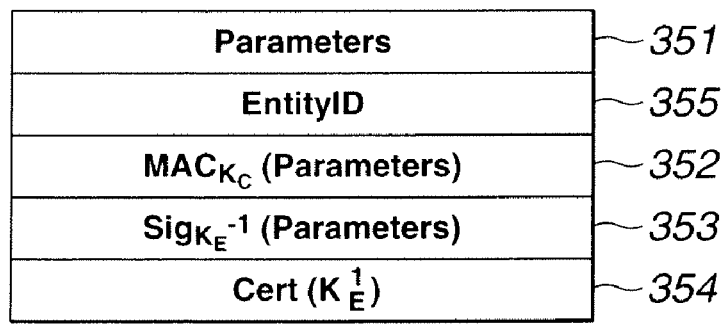
FIG. 24 illustrates the structure in case the parameter file has been changed.

To the parameter file 333 are appended a parameter statement portion 351, authentication code 352 by contents key, a signature 353 by a contents purveyor, and a writ of authentication 354 verifying the signature, as shown in FIG. 23. The contents key is denoted KC, whilst the private key and the public key of the contents purveyor who prepared the contents are denoted $K^{-1}_E$ and $K^1_E$, respectively.

The parameter file 333 can be rewritten by a contents purveyor other than the contents purveyor who prepared the automaton file 332, for example, a secondary purveyor such as a contents retail dealer or by an intermediate contents distributor. To the parameter file 333 so rewritten is appended a unique entity ID 355 accorded to the purveyors or to the intermediate distributor. Meanwhile, $K'_C$ is the contents key of the secondary purveyor, with $K'_C = H(K_C, \text{Entity ID})$. The contents key $K'_C$ of the secondary purveyor is formulated from the contents key $K_C$ of the primary purveyor. The primary and secondary purveyors are distinguished from each other by the writs of authentication.

The parameter file 333 is verified by MAC if the contents key is already to hand. If the contents key is not available for reasons pertinent to safety, the parameter file 333 is verified by signatures and instruments.

With the primary and secondary contents purveyors S and A, and with the terminal B, the protocol verified by MAC is as follows. S→A indicates transmission from S to A, S→B indicates transmission from S to B, and A→B indicates transmission from A to B. $ID_A$ indicates an ID of the device A.

$S \to A: K'_C = H(K_C, ID_A)$ $S \to B: X = E_{K_S}(K_C)1$ $A \to B: ID_A, Parameters, M=MACK'_C(Parameters)$ $B: M \equiv MAC'_{K_C}(Parameters)?$ This parameter statement portion 351 states coefficients of a function for changing the values stated in the automaton stating portion 341 of the automaton file 332. For example, in the example shown in FIG. 13, there are occasions wherein the price of the music contents becomes a function, as shown below:

$<q_0, pay(f_1(10)), q_1>$ $<q_1, pay(f_2(10) \times n), q_2>$

In this case, the above functions $f_1$ and $f_2$ are defined, for example, as follows:

$f_1(n) = 0.9n$ $f_2(n) = 90 + 0.1n$.

By defining the functions as above, it is possible for the primary purveyor to set a default price value and for the second purveyor to rewrite the parameter file 333 to change the price.

Figure 25:
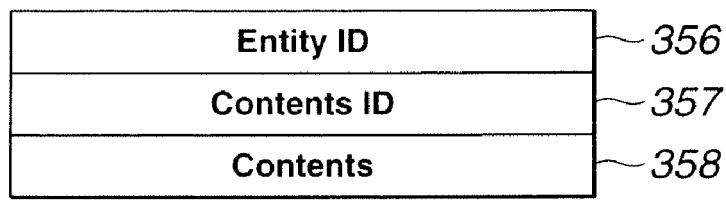
FIG. 25 illustrates the structure of a parameter statement portion of the parameter file.

The above-described parameter statement portion 351 is made up of an entry ID 356, contents ID 357 and the coefficients information 358, as shown in FIG. 25.

The hysteresis file 334 is a file for stating the trajectory of the operation of the music contents, operated based on the contents of description, in the automaton stating portion 341. The status and the variable in the tuple of the automaton stating portion 341 is recorded. For example, if reproduction is carried out twice in the example of FIG. 13, $<q_0, q_1, q_0, q_1>$ results, so that the trajectory of the following operation:

$<pay10, play, pay10, play>$ is obtained.

If this is summed and uploaded in e.g., the comprehensive management unit (X)15, it is possible to compute the amount payable by the user.

In the music contents distributing system 1, in which the unified using condition information, representing the using condition by an automaton in which the policy itself and its concrete value are programmed, is used, it is possible to elevate the degree of freedom in the description of the contents using conditions.

(4) Re-Storage and Re-Downloading of Destructed Music Contents

The backup of music contents by the comprehensive management unit (X)315 is now explained.

Figure 26:
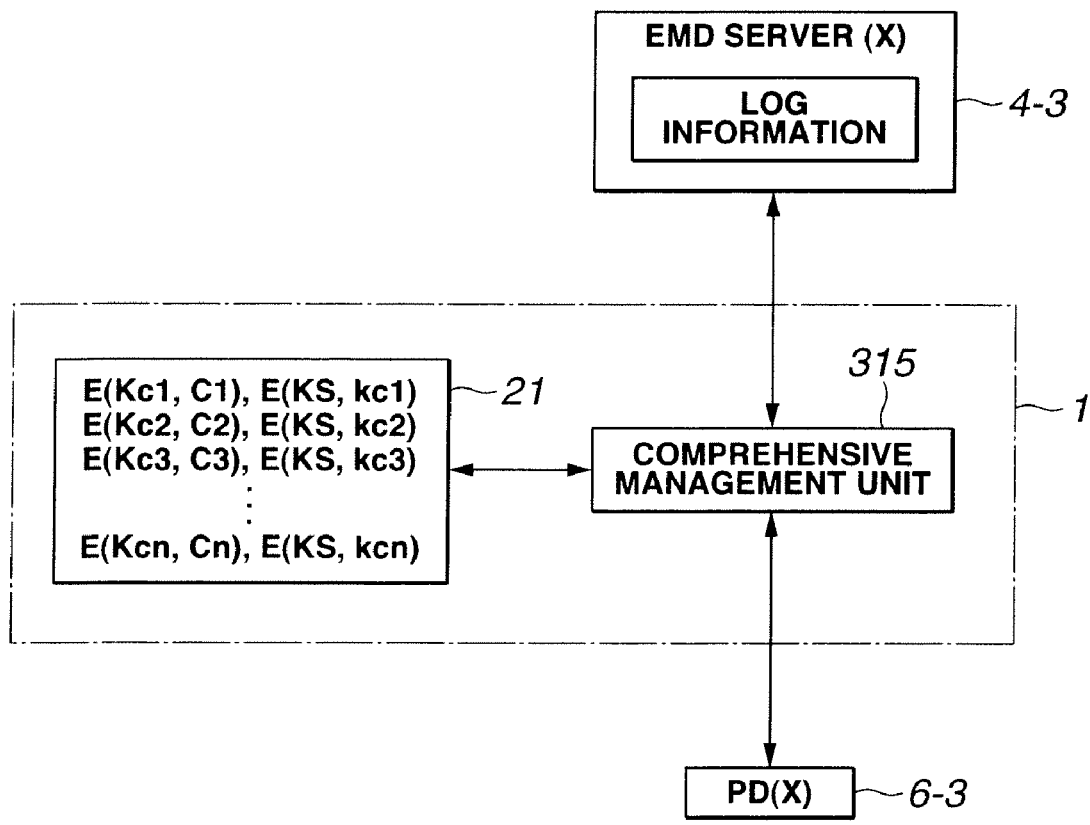
FIG. 26 illustrates a method for supervising the contents by the comprehensive management unit.

First, the key management method of the comprehensive management unit (X)315 is explained by referring to FIG. 26.

The comprehensive management unit (X)315 stores the music contents C1, C2, C3, . . . Cn in the hard disc 21 in the personal computer 3. The comprehensive management unit (X)315 also stores the contents keys Kc1, Kc2, Kc3, . . . , Kcn, associated with the music contents C1, C2, C3, . . . Cn, respectively. The contents keys Kc are in a one-for-one correspondence to the music contents C. To the music contents C1, C2, C3, . . . Cn are appended the contents IDs for identification. These contents IDs are termed CID1, CID2, CID3, . . . , CIDn.

The music contents C1, C2, C3, . . . Cn are encrypted by the contents keys Kc1, Kc2, Kc3, . . . Kcn and, in this state, are recorded in the hard disc 21 of the personal computer 3. E(K, C) denotes that the contents C have been encrypted with the key K. Usually, the contents IDs are recorded in a header of the music contents C and encrypted along with the music contents C, or the MAC is appended to the music contents C, such that the contents IDs are not separable from the main body portion of the music contents.

The contents keys Kc1, Kc2, Kc3, . . . Kcn are encrypted by the storage keys KS and are recorded in the state of E(SK, Kc1), E(SK, Kc2), E(SK, Kc3), . . . E(SK, Kcn) in the hard disc 21 of the personal computer 1. This storage keys Ks exhibits so-called resistance to short wavelength and is saved in a recording area that cannot be referenced by an ordinary user.

If, in the comprehensive management unit (X)315, where the key management is performed as described above, the music contents C1, for example, is to be reproduced, the contents key Kc1 is decrypted, using the storage key KS, and subsequently the music contents C1 is decrypted, using this contents key Kc1. In this manner, the comprehensive management unit (X)315 is able to reproduce the music contents C1.

If, in the comprehensive management unit (X)315, where the key management is performed as described above, the music contents C1 is to be moved from the hard disc 21 to the portable device (X) 6-3, reciprocal authentication is performed with the portable device (X) 6-3. On completion of the authentication, the contents key Kc1 is decrypted by the session key and the encrypted contents key Kc1 as well as the encrypted music contents C1 is transferred to the portable device (X) 6-3. The contents key Kc1 and the encrypted music contents C1 are both transferred to the portable device (X) 6-3. The contents key Kc1 and the music contents C1 are both erased from the hard disc 21. By so doing, the comprehensive management unit (X)315 is able to move the music contents C1 to the portable device (X) 6-3. The method of regenerating the music contents as becomes necessary when the music contents or the contents key cease to be reproducible from the hard disc 21 due to, for example, destruction of the hard disc 21, is hereinafter explained.

Usually, the comprehensive management unit (X)315 saves the backup data of the encrypted music contents C and the contents key Kc in the hard disc 21.

Also, usually, the comprehensive management unit (X)315 is supervising the purchase records of the music contents downloaded form the EMD server (X) 4-3 and the list of the contents ID of the totality of the music contents stored in the hard disc 21 as use log information. This log information is to be updated at the time of controlling of the music contents as when the music contents is downloaded from the EMD server (X) 4-3 or moved to the portable device (X) 6-3. The comprehensive management unit (X)315 uploads the log information to the EMD server (X) 4-3 periodically or after accessing.

If the music contents C or the contents key Kc stored in the hard disc 21 of the comprehensive management unit (X)315 are destroyed, the following processing is executed.

If the music contents C or the contents key Kc are destroyed, the comprehensive management unit (X)315 first accesses the EMD server (X) 4-3 to perform user authentication.

The EMD server (X) 4-3 then refers to the use log information of the comprehensive management unit (X)315, from the user ID of the authorized user, to generate an integrity check value (ICV). This ICV is generated, based on the CID, as the contents ID of the music contents C stated in the use log information and on the storage key KS of the comprehensive management unit (X)315, in accordance with:

$$ICV=H(SK, CIDI\|CID2\| \ldots \|CIDn)$$

where H(K, Data) is a uni-directional hash function and has its value changed with the key K.

The EMD server (X) 4-3 then transmits the generated integrity check value ICV to the comprehensive management unit (X)315.

If the music contents C or the contents key Kc are backed up, the comprehensive management unit (X)315 re-stores the backup data to save the music contents C or the contents key Kc in the hard disc 21. If the music contents C or the contents key Kc are backed up, the music contents C or the contents key Kc destructed is to be re-distributed from the EMD server (X) 4-3. At this time, the EMD server (X) 4-3 references to the purchase hysteresis of the user, and refrains from assessment if the contents have once been purchased.

The comprehensive management unit (X)315 performs the above processing to re-construct the music contents C or the contents key Kc destroyed.

If the music contents C or the contents key Kc regenerated are to be reproduced or controlled, the comprehensive management unit (X)315 checks the CID of the music contents by the integrity check value ICV. By checking the music contents C or the contents key Kc reconstructed using the integrity check value ICV, a user with a malignant intention, who memorized E (Kci, Ci) as encrypted music contents Ci and re-stored the music contents, in case the music contents Ci is moved to the portable device (X) 6-3 and is erased from the hard disc 21, is unable to reproduce or move the data by way of control.

If it is not the music contents C or the contents key Kc but the storage key KS that has been destroyed, the comprehensive management unit (X)315 is re-installed. Even in such case, re-storage or re-downloading is feasible if user registration is made in the EMD server (X) 4-3 and the log information is uploaded.

In the music contents distributing system 1, as described above, music contents can be re-constructed, under protection of the copyright, even if the music contents have been destroyed by hard disc crushing. If, for example, the music contents have been purchased correctly, it can be re-constructed free of charge.

(5) Method for Allotting Master Key and Authentication Key of the Comprehensive Management Unit (X)

Between the comprehensive management unit (X)315 and the portable device (X) 6-3, there occurs reciprocal authentication using the ID and an authentication key (MG-ID/IK) proper to the portable device (X) 6-3 and a master key (OMG-MK) proper to the comprehensive management unit (X)315.

If there has occurred reciprocal authentication between the comprehensive management unit (X)315 and the portable device (X) 6-3, it becomes possible for the comprehensive management unit (X)315 to send music contents from the comprehensive management unit (X)315 to the portable device (X) 6-3 or to return the music contents from the portable device (X) 6-3 to the comprehensive management unit (X)315. Meanwhile, the comprehensive management unit (X)315 holds the encrypted music contents in the hard disc 21 of the perspective view 3, whilst the portable device (X) 6-3 holds the encrypted music contents in the internal recording medium, such as a memory card. So, if the music contents are sent from the comprehensive management unit (X)315 to the portable device (X) 6-3, music contents on the hard disc 21 on the personal computer 1 are transferred to the memory card loaded on the portable device 10. On the other hand, if music contents are to be sent from the portable device (X) 6-3 to the comprehensive management unit (X)315, the music contents on the memory card loaded on the portable device (X) 6-3 are transferred to the hard disc 21 on the personal computer 1.

The portable device (X) 6-3 holds ID information (MG-ID), authentication keys (MG-IK) for plural generations and master keys (OMG-MK) for plural generations from the outset. The portable device (X) 6-3 is not furnished with these keys or the information from outside. The portable device (X) 6-3 updates the generation of the authentication keys (MG-IK) and the master keys (OMG-MK). The portable device (X) 6-3 effectuates reciprocal authentication not by the authentication key or master key of the old generation, but by those of the new generation. In the following it is assumed that the portable device (X) 6-3 is holding the authentication keys (MG-ID) and the master keys (OMG-MK) for 100 generations of from zeroth to 100th generations. The authentication key for the ith generation is denoted the (MG-IK[i]) and the master key for the ith generation is denoted the (OMG-MK [i]).

The comprehensive management unit (X)315, holding the master keys (OMG-MK), is able to transfer the music contents from e.g., a compact disc for audio into the personal computer 1 for storage therein. On the other hand, the comprehensive management unit (X)315, holding the master keys (OMG-MK), is able to download the music contents from the EMD server (X) 4-3 for storage in the personal computer 1.

It is noted that, in the comprehensive management unit (X)315, the master key (OMG-MK), that is able to transfer the music contents from the compact disc but is unable to download music contents from the EMD server (X) 4-3, differs from the master key (OMG-MK), that is able to transfer music contents both from the CD and from the EMD server (X) 4-3. In the following, the key that is able to transfer the music contents from the compact disc but is unable to download music contents from the EMD server (X) 4-3 is termed a key dedicated to ripping and the key that is able to transfer music contents both from the CD and the EMD server (X) 4-3 is termed an EMD key.

In the present embodiment, the master key for the zeroth generation (OMG-MK[0]) is the key dedicated to ripping, whilst the master keys (OMG-MK[1 to 99]) are EMD keys.

The sequence for processing employing the key dedicated to ripping is explained.

Figure 27:
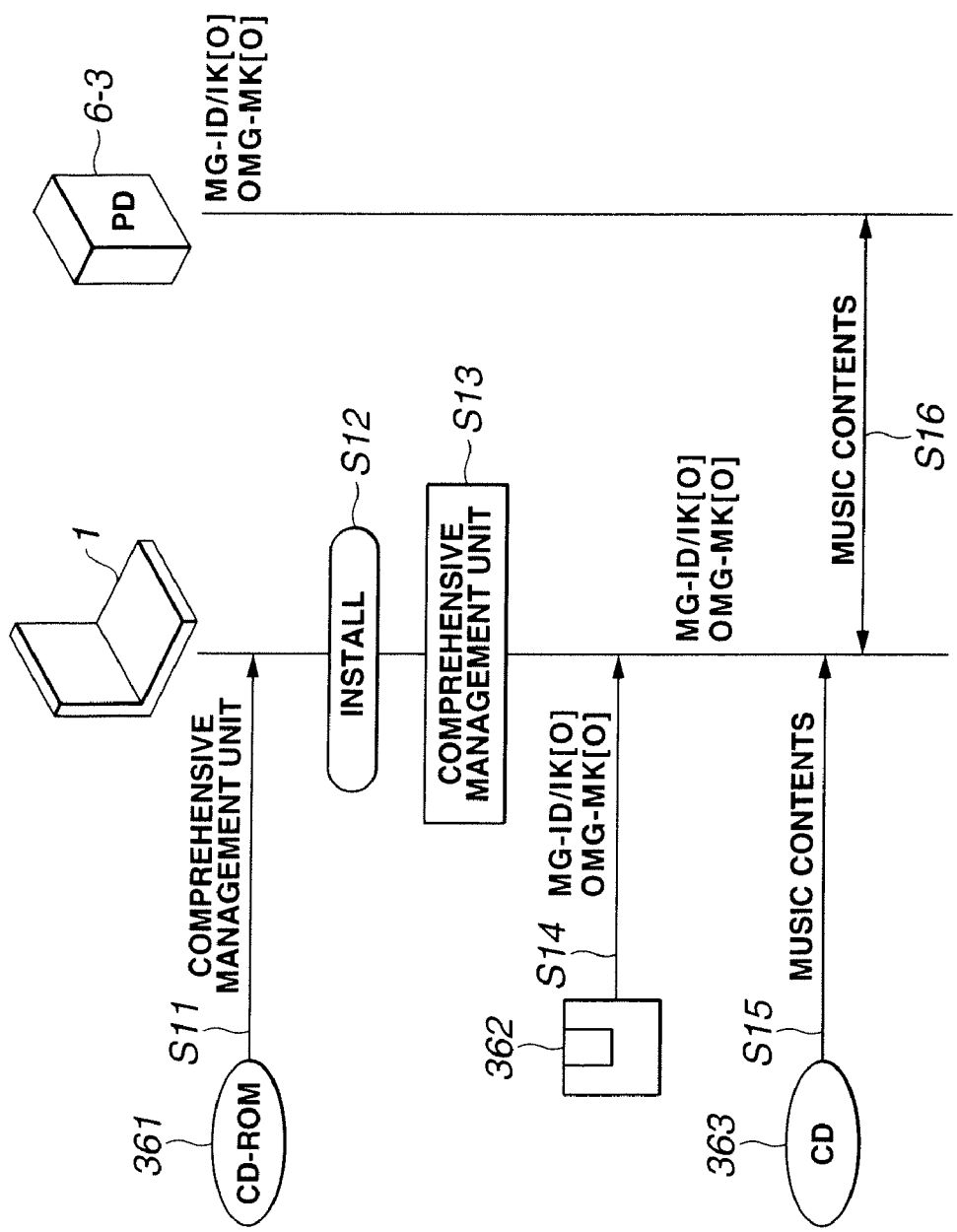
FIG. 27 illustrates the processing sequence in case the comprehensive management unit is installed from a CD-ROM.

If the comprehensive management unit (X)315 is to be installed from the CD-ROM, the portable device (X) 6-3 and a floppy disc 52, for example, are sold as a set with a CD-ROM 51 having installed therein an installing software of the comprehensive management unit (X)315, as shown in FIG. 27. In the floppy disc 52 are stored the ID information (MG-ID) for the portable device (X) 6-3, the authentication key for the zeroth generation (MG-IK[0]) and the master key for the zeroth generation (OMG-MK[0]).

For enabling the sold portable device (X) 6-3 etc., to be used, the CD-ROM 361 is first loaded on the personal computer 1 (step S11). The comprehensive management unit (X)315 then is installed from the CD-ROM 361 onto the personal computer 1. The comprehensive management unit (X)315 then is installed in the hard disc of the personal computer 1 (step S13). The ID information (MG-ID) of the portable device (X) 6-3, stored in the floppy disc 362, the authentication key for the zeroth generation (MG-IK[0]) and the master key for the zeroth generation (OMG-MK[0]) are then saved in the personal computer 1 (step S14).

This enables the music contents furnished by e.g., a music CD 363 to be stored in the hard disc of the personal computer 1 (step S15). Meanwhile, since the master key for the zeroth generation (OMG-MK[0]) is a key dedicated to ripping, no music contents can be downloaded from the EMD server (X) 4-3. The portable device (X) 6-3 holds authentication keys and master keys for 100 generations to cope with generation updating. In the initial setting, the generation is the zeroth generation. So, reciprocal authentication between the comprehensive management unit (X)315 holding the authentication key of the zeroth generation and the master key and the portable device (X) 6-3 becomes feasible. Thus, it becomes possible to store the music contents furnished by the music CD 363 etc in the memory card of the portable device (X) 6-3 (step S16).

Figure 28:
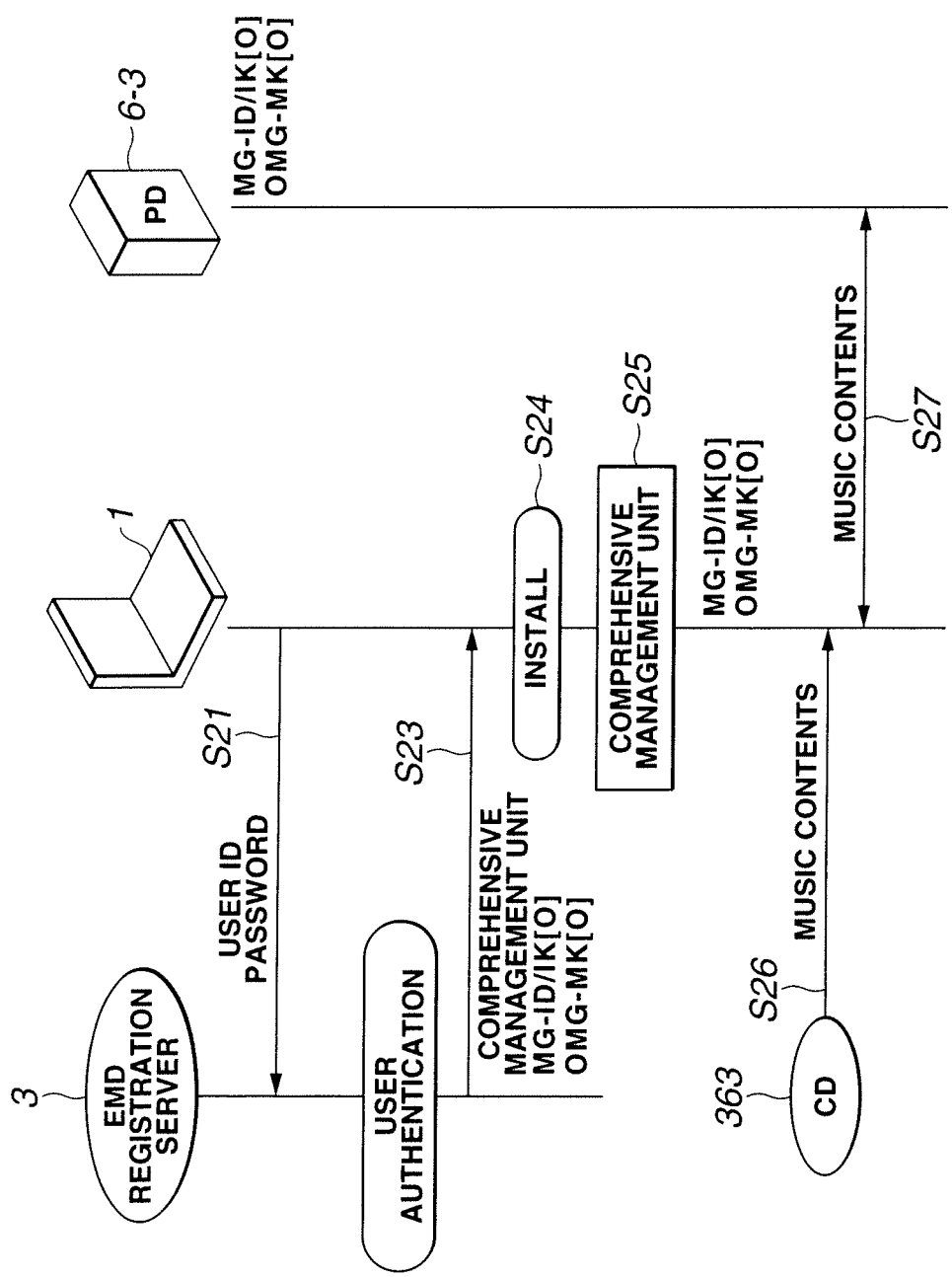
FIG. 28 illustrates the processing sequence in case the comprehensive management unit is installed on being downloaded from the network.

On the other hand, if the comprehensive management unit (X)315 is furnished through the network, the address, user ID and the password etc., on the EMD registration server 3 on the Internet, along with the comprehensive management unit (X)315, as shown in FIG. 28.

If the portable device (X) 6-3 etc., as sold, is to be rendered usable, the EMD registration server 3 on the network is accessed, using the user ID and the password (step S21). The EMD registration server 3 then authenticates the user ID and the password (step S22). If there is no problem in the authentication, the EMD registration server 3 transmits the installing software of the comprehensive management unit (X)315, ID information (MG-ID) of the portable device (X) 6-3, the authentication key of the zeroth generation (MG-IK[0]) and the master key of the zeroth generation (OMG-MK[0]) to the personal computer 1 (step S23). The personal computer 1 then boots the installing software of the comprehensive management unit (X)315 to install the comprehensive management unit (X)315, while saving the ID information (MG-ID) of the portable device (X) 6-3, the authentication key of the zeroth generation (MG-IK[0]) and the master key of the zeroth generation (OMG-MK[0]) in the hard disc 21 (step S24). This stores the comprehensive management unit (X)315 in the hard disc (step S25).

This enables the comprehensive management unit (X)315, furnished by e.g., the music CD 363, to be stored in the hard disc 21 of the personal computer 1 (step S26). Meanwhile, since the master key of the zeroth generation (OMG-MK[0]) is a key dedicated to ripping, the music contents cannot be downloaded from the EMD server (X) 4-3.

The portable device (X) 6-3 holds the authentication keys and master keys for 100 generations, in order to cope with the generation innovation. In the initial state, the generation is set to the zeroth generation. So, the reciprocal authentication between the comprehensive management unit (X)315 holding the authentication key and the master key of the zeroth generation and the portable device (X) 6-3 becomes possible. Therefore, the music contents furnished by the music CD 363 etc., can be stored in the memory card of the portable device (X) 6-3.

In addition to the method shown in FIGS. 27 and 28, such a method may also be used in which the comprehensive management unit (X)315 and the master key of the zeroth generation (OMG-MK[0]) dedicated to ripping is stored in the CD-ROM 361 and in which the authentication ID with respect to the portable device (X) 6-3 and the authentication key for the zeroth generation (MG-ID/IK) are furnished over the network.

The sequence of operations for updating the key dedicated to ripping to an EMD key to enable the handling of music contents downloaded from the EMD server (X) 4-3 is hereinafter explained.

The comprehensive management unit (X)315 is furnished via a removable medium, such as a CD-ROM, or over a network, such as Internet, by the sequence of operations shown in FIGS. 27 and 28, and is installed in the hard disc 21 in the personal computer 1. At this time, the comprehensive management unit (X)315 is holding the master key of the zeroth generation (OMG-MK[0]) dedicated to ripping and the authentication key for the zeroth generation (MG-ID/IK [0]), with the key of the portable device (X) 6-3 being in the default generation.

Figure 29:
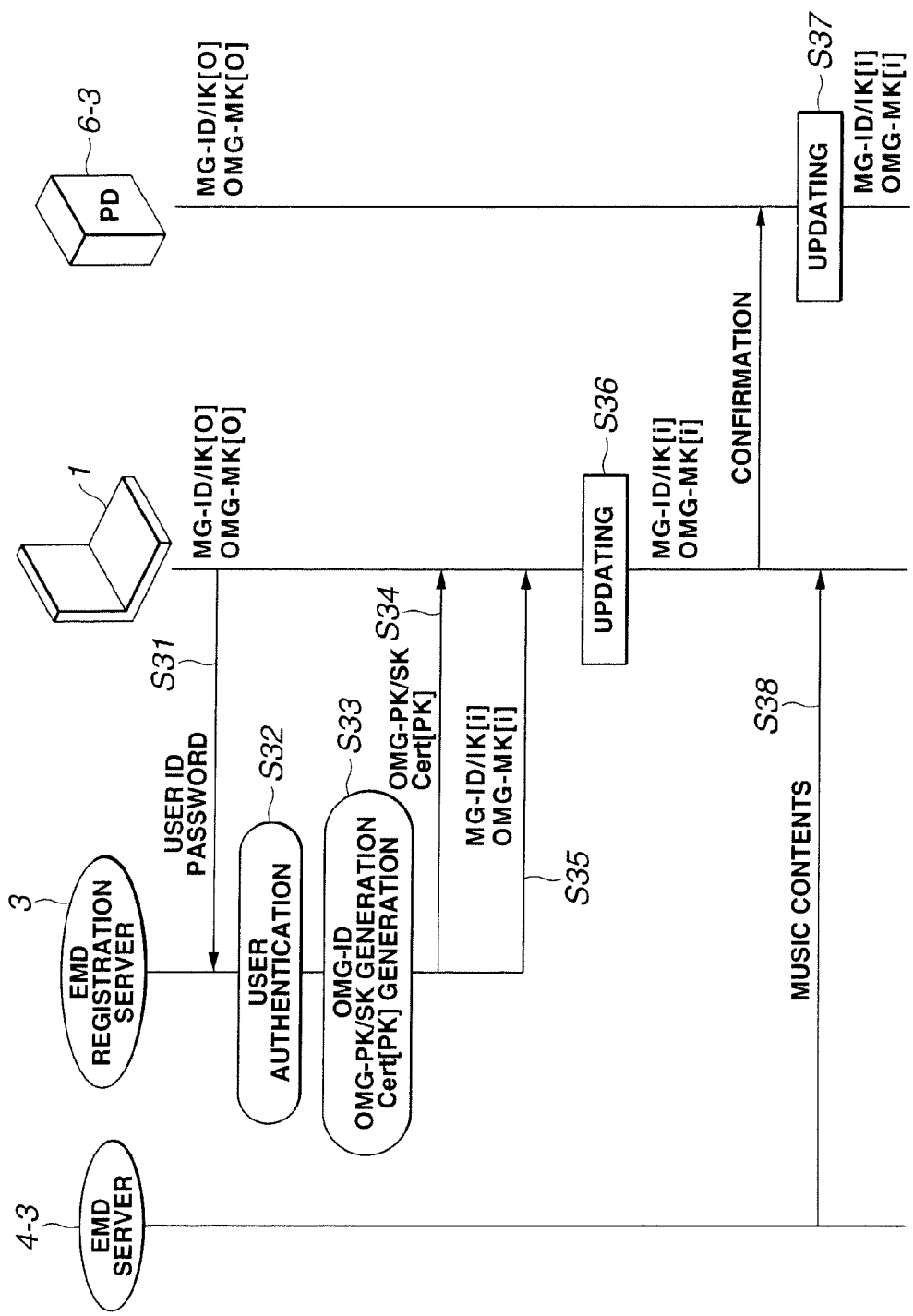
FIG. 29 illustrates an updating sequence from a ripping key to an EMD key.

First, the personal computer 1 accesses th EMD registration server 3 on the network, using the user ID and the password (step S31), as shown in FIG. 29. The EMD registration server 3 then authenticates the user ID and the password (step S32). If there is no problem in authentication, the EMD registration server 3 registers the ID information of the personal computer 1 (OMG-ID) to generate an open key (OMG-PK), secret key (OMG-SK) and the writ of authentication (Cert [PK]) of the open key for the comprehensive management unit (X)315 to connect to the EMD server (X) 4-3 (step S33). The EMD registration server 3 then transmits the generated open key (OMG-PK), secret key (OMG-SK) and the writ of authentication (Cert [PK]) to the personal computer 1 (step S34). The EMD registration server 3 then transmits the ID information of the portable device (X) 6-3 (MG-ID), authentication key of the ith generation (MG-IK[i]) and the master key of the ith generation (OMG-MK[i]) to the personal computer 1 (step S35). The EMD registration server 3 then updates the received keys etc., based on the received ID information (MG-ID), authentication key of the ith generation (MG-IK[i]) and the master key of the ith generation (OMG-MK[i]) to the ith generation (step S36). The comprehensive management unit (X)315 then executes authentication with the portable device (X) 6-3 (step S37). On authentication the portable device (X) 6-3 updates the generation of the own key to the ith generation (step S38).

This enables the comprehensive management unit (X)315 to store music contents furnished by the music CD 363 to be stored in the hard disc of the personal computer 1 as well as to store the music contents downloaded from the EMD server (X) 4-3 in the hard disc 21 of the personal computer 1 (step S39).

The sequence of operations of generation innovation of e.g., the EMD key is explained.

The comprehensive management unit (X)315 is holding the master key of the ith generation (OMG-MK[i]), ID for au and the authentication key of the zeroth generation (MG-IK [i]), with the generation of the portable device (X) 6-3 being also the ith generation.

Figure 30:
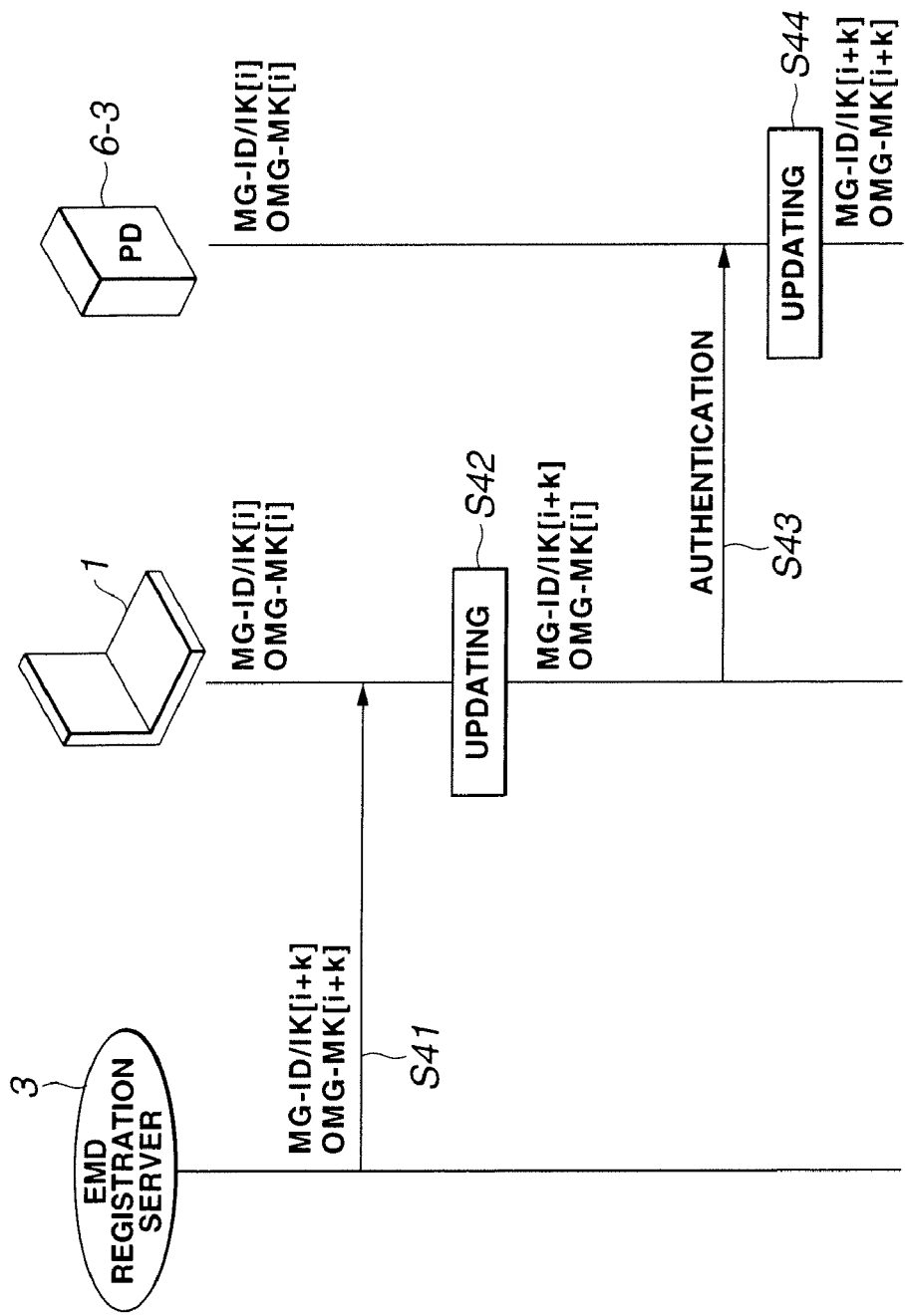
FIG. 30 illustrates a first example of the EMD key updating sequence.

First, as shown in FIG. 30, if the personal computer 1 accesses the EMD registration server 3 to do some processing, the EMD registration server 3 authenticates the ID of the comprehensive management unit (X)315 to transmit the authentication key of the (i+k)th generation (MG-IK[i+k]) and the master key of the (i+k)th generation (OMG-MK[i+k]) to the personal computer 1 (step S41). The comprehensive management unit (X)315 of the personal computer 1 updates the received authentication key and the master hey to the (i+k)th generation (step S42). The comprehensive management unit (X)315 then authenticates the portable device (X)

6-3 (step S43). When authenticated, the portable device (X) 6-3 updates the generation of the own key from the ith generation to the (i+k)th generation (step S44).

Figure 31:
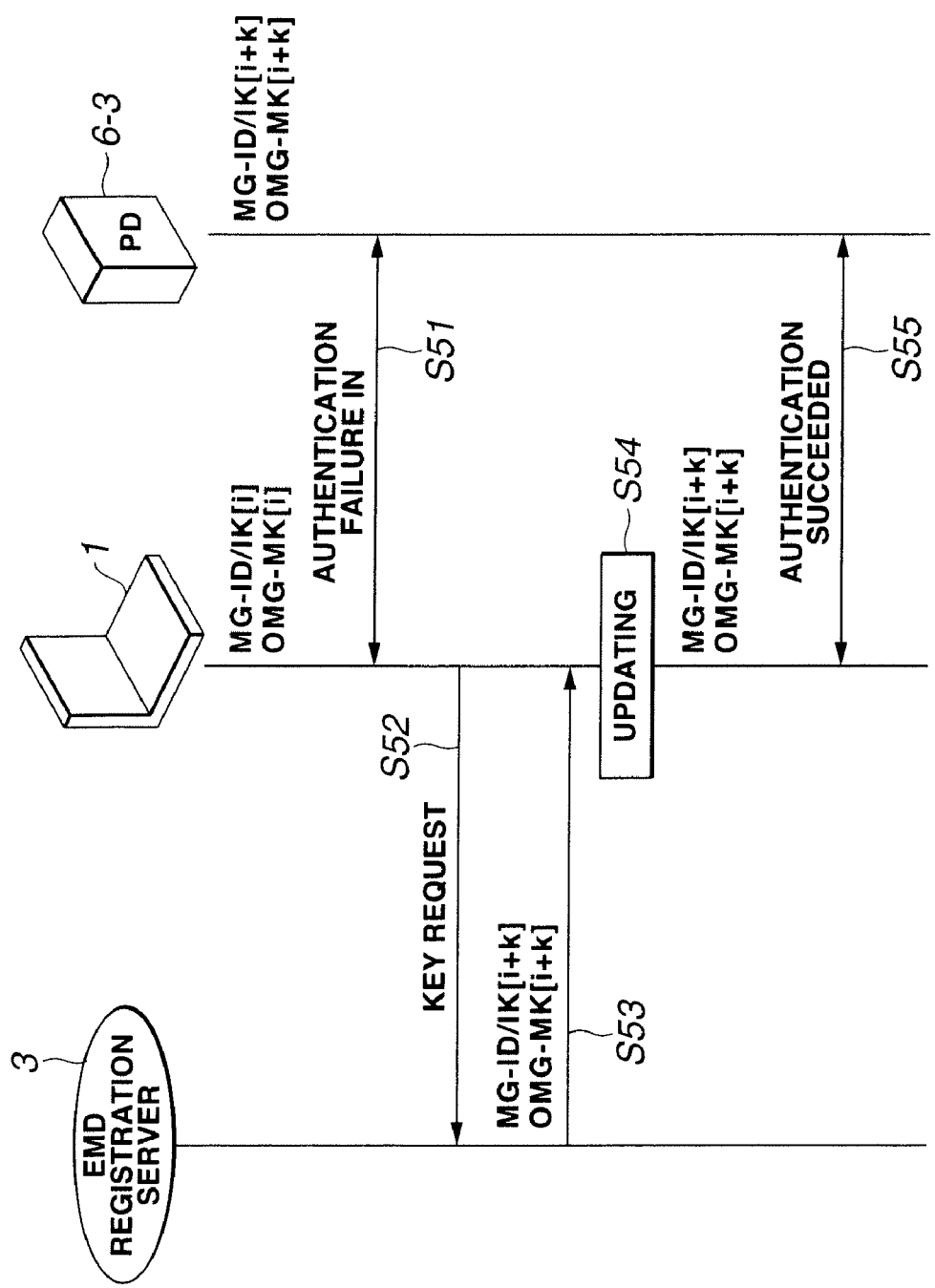
FIG. 31 illustrates a second example of the EMD key updating sequence.

On the other hand, as shown in FIG. 31, if the generation of the authentication key etc., used by the portable device (X) 6-3, is the (i+k)th generation, and that of the authentication key etc., held by the comprehensive management unit (X)315 is the ith generation, the authentication between the portable device (X) 6-3 and comprehensive management unit (X)315 results in failure, even if such authentication is attempted. (Step S51). If the authentication results in failure, the comprehensive management unit (X)315 requests a key to the EMD registration server 3 (step S52). If there is a key request, the EMD registration server 3 authenticates the ID of the comprehensive management unit (X)315 to transmit the authentication key of the (i+k)th generation (MG-IK[i+k]) and the master key of the (i+k)th generation (OMG-MK[i+k]) (step S53). The comprehensive management unit (X)315 then updates the received authentication key and master key to the (i+k)th generation (step S54). The comprehensive management unit (X)315 then authenticates the portable device (X) 6-3 (step S55).

This enables the comprehensive management unit (X)315 to store the music contents furnished by the music CD 363 etc., to be stored in the hard disc 21 in the personal computer 1 and to store the music contents downloaded from the EMD server (X) 4-3 to be stored in the hard disc 21 in the personal computer 1 (step S38).

In the above-described music contents distributing system 1, the master and authentication keys, used by the comprehensive management unit (X)315 and the portable device (X) 6-3, are classed into keys dedicated to ripping and those connected to the server, and the keys connected to the server are downloaded over the network. The result is that, in the music contents distributing system 1, safety in the music contents distributed from the server is improved, such that, if the keys dedicated to ripping are broken, the music contents downloaded from the server cannot be destroyed.

In the music contents distributing system 1, the master and authentication keys, used by the comprehensive management unit (X)315 and the portable device (X) 6-3, are used subject to generation innovation. Moreover, the comprehensive management unit (X)315 is fed with the master and authentication keys over the network for generation innovation, thus raising safety of the music contents.

INDUSTRIAL APPLICABILITY

According to the present invention, a data processing apparatus reproduces and/or controls restored or re-distributed backup contents data, based on the using log information re-acquired from a contents server.

Thus, according to the present invention, even if the contents data, distributed over the network, is once destroyed, the contents data can be restored as the copyright protection is assured.

The invention claimed is:

1. A contents furnishing system, comprising:
a contents server configured to distribute contents data over a network; and
a data processor employing a reproduction control program for reproducing and/or controlling the contents data, said data processor being configured to store the contents data distributed from said contents server to a recording medium for reproduction and/or control, and said data processor being configured to transmit usage log information of said stored contents data including contents identification information of said stored contents data based on an updated state of the contents data on said recording medium to said contents server,
wherein if the contents data are not available from said recording medium, said unavailable contents data are re-distributed from said contents server through acquisition of the usage log information from said contents server, and reproduction and/or control of the re-distributed contents data is performed in accordance with said usage log information.

2. The contents furnishing system according to claim 1, wherein the contents server is configured to re-distribute the unavailable contents data based on a determination of whether the unavailable contents data was previously purchased by a user of the data processor.

3. An information processing apparatus, comprising:
a playback controlling unit configured to reproduce and/or control contents data distributed from a contents server over a network; and
a storing unit configured to store the contents data distributed from said contents server;
a communication unit configured to transmit log information of said contents data, including contents identification information of stored contents data to said contents server,
wherein said communication unit receives the contents data re-distributed from said contents server based on the log information, when said playback controlling unit is unable to acquire the contents data from said storing unit.

4. The information processing apparatus according to claim 3, wherein said log information includes a contents purchased record with respect to said contents server.

5. The information processing apparatus according to claim 3, wherein the communication unit transmits the log information of said contents data to the contents server upon accessing the contents server.

6. The information processing apparatus according to claim 3, wherein the communication unit is configured to receive an integrity check value (ICV), derived from said log information, from said contents server; and
the playback control unit is configured to control the re-distributed contents data based on the received ICV.

7. The information processing apparatus according to claim 3, wherein the communication unit is configured to receive the contents data re-distributed from said contents server based on a determination of whether the unavailable contents data was previously purchased by a user of the information processing apparatus.

8. A method of providing contents via a data network, comprising:
storing contents data to a contents server operably linked to the data network;
accessing the contents server to obtain the contents data for storage to a recording medium remotely located with respect to the contents server;
transmitting, by an information processing apparatus, usage log information of the storage contents of the recording medium, including contents identification information of the stored contents data based on an updated state of the contents data on the recording medium to the contents server;
re-distributing, by the contents server, the contents data no longer available from the recording medium by referring to the usage log information of the contents server,
wherein the contents data which is no longer available from the recording medium is provided to the recording medium from the contents server for replacing the contents data no longer available from the recording medium, the contents data no longer available from the recording medium being identified by the usage log information provided to the contents server.

9. The method of claim 8, wherein said log information includes a contents purchased record with respect to said contents server.

10. The method of claim 8, wherein the log information is transmitted to the contents server upon accessing the contents server.

11. The method of claim 8, wherein an integrity check value (ICV) is derived from the log information, from the contents server, the redistributed contents being based on the received ICV.

12. The method of claim 8, further comprising:
providing, by the contents server, the contents data which is no longer available from the recording medium based on a determination of whether the unavailable contents data was previously purchased by a user of the information processing apparatus.

13. A method of obtaining contents from a contents server operably linked to a network via an information processing apparatus accessing the contents server via the network, comprising:
reproducing, by the information processing apparatus, contents data distributed from the contents server;
storing, by the information processing apparatus, the contents data distributed from the contents server;
transmitting log information of the contents data, including contents identification information of the contents data stored by the information processing apparatus to the contents server; and
obtaining the contents data for storage in the information processing apparatus based upon an absence of the contents data previously stored in the information processing apparatus as indicated by the log information.

14. The method of claim 13, wherein the obtaining step comprises obtaining the contents data for storage in the information processing apparatus based on a determination of whether the absent contents data was previously purchased by a user of the information processing apparatus.

15. A computer readable storage medium storing computer program instructions which cause a computer to execute a method of furnishing contents from a contents server to an information processing apparatus operably linked to a network, comprising;
storing contents data distributed from the contents server;
transmitting log information of the contents data, including contents identification information of the contents data stored by the information processing apparatus to the contents server; and
obtaining the contents data for storage in the information processing apparatus based upon an absence of the contents data previously stored in the information processing apparatus as indicated by the log information.

16. The computer readable storage medium of claim 15, wherein the obtaining step comprises obtaining the contents data for storage in the information processing apparatus based on a determination of whether the absent contents data was previously purchased by a user of the data processor.

* * * * *